US012062122B2

(12) United States Patent
Shirai et al.

(10) Patent No.: US 12,062,122 B2
(45) Date of Patent: Aug. 13, 2024

(54) SYSTEM AND METHOD FOR USER VIRTUAL OBJECT CONTROLLING OTHER VIRTUAL OBJECTS TRIGGERING PREDETERMINED ANIMATIONS

(71) Applicant: GREE, Inc., Tokyo (JP)

(72) Inventors: Akihiko Shirai, Kanagawa (JP); Takuma Kato, Tokyo (JP)

(73) Assignee: GREE, INC., Tokyo (JP)

( * ) Notice: Subject to any disclaimer, the term of this patent is extended or adjusted under 35 U.S.C. 154(b) by 86 days.

(21) Appl. No.: 17/851,140

(22) Filed: Jun. 28, 2022

(65) Prior Publication Data

US 2022/0414962 A1 Dec. 29, 2022

(30) Foreign Application Priority Data

Jun. 28, 2021 (JP) .................................. 2021-106393

(51) Int. Cl.
*G06T 13/40* (2011.01)
*G06F 3/01* (2006.01)
*G06V 40/20* (2022.01)

(52) U.S. Cl.
CPC .............. *G06T 13/40* (2013.01); *G06F 3/011* (2013.01); *G06V 40/28* (2022.01)

(58) Field of Classification Search
None
See application file for complete search history.

(56) References Cited

U.S. PATENT DOCUMENTS

| 9,245,177 | B2 | 1/2016 | Prez | |
|---|---|---|---|---|
| 10,546,407 | B2 * | 1/2020 | Inomata | ................... G06F 1/163 |
| 10,748,342 | B2 * | 8/2020 | Joyce | ......................... G06T 7/20 |

(Continued)

FOREIGN PATENT DOCUMENTS

| CN | 108140383 A | 6/2018 |
|---|---|---|
| CN | 108986192 A | 12/2018 |

(Continued)

OTHER PUBLICATIONS

Japanese Office Action issued Feb. 14, 2023, in corresponding Japanese Patent Application 2021-106393, 4pp.

(Continued)

*Primary Examiner* — Edward Martello
(74) *Attorney, Agent, or Firm* — XSENSUS LLP

(57) ABSTRACT

An information processing system includes a memory and processing circuitry configured to generate a display image by rendering plural objects in a virtual space according to the object information; acquire a user input relating to a user object of the plural objects, the user object associated with the user; determine movement of the user object in the virtual space in accordance with the user input; generate positional relationship information indicating a positional relationship in the virtual space between the user object and a predetermined object of the plural objects; store first rendering information for rendering a first animation with a combination of the predetermined object and the user object; and generate the first animation according to the first rendering information in a case that a distance between the (Continued)

predetermined object and the user object is shorter than or equal to a predetermined distance according to the positional relationship information.

20 Claims, 21 Drawing Sheets

(56) References Cited

U.S. PATENT DOCUMENTS

| | | | |
|---|---|---|---|
| 10,796,489 B1* | 10/2020 | Cordes | A63F 13/213 |
| 11,367,260 B2 | 6/2022 | Kawakami et al. | |
| 11,500,456 B2 | 11/2022 | Iwaki | |
| 2010/0303289 A1* | 12/2010 | Polzin | G06V 40/103 |
| | | | 348/135 |
| 2019/0138266 A1 | 5/2019 | Takechi et al. | |
| 2022/0083126 A1 | 3/2022 | Iwaki | |
| 2023/0049410 A1 | 2/2023 | Saito | |

FOREIGN PATENT DOCUMENTS

| | | |
|---|---|---|
| JP | 7-230559 A | 8/1995 |
| JP | 2003-67780 A | 3/2003 |
| JP | 2018-14575 A | 1/2018 |
| JP | 2018-128966 A | 8/2018 |
| JP | 2020-17244 A | 1/2020 |
| JP | 6644928 B1 | 1/2020 |
| JP | 2020-057207 A | 4/2020 |
| JP | 6840876 B1 | 2/2021 |
| JP | 2021-064253 A | 4/2021 |
| KR | 2004-0014123 A | 2/2004 |
| KR | 10-2018-0030767 A | 3/2018 |
| WO | 2020/068878 A1 | 4/2020 |

OTHER PUBLICATIONS

Japanese Office Action issued Jun. 20, 2023, in corresponding Japanese Patent Application 2020-072287, 6pp.
International Search Report and Written Opinion mailed on Jul. 6, 2021, received for PCT Application PCT/JP2021/015347, filed on Apr. 13, 2021, 9 pages including English Translation.
"Custom Cast", Available Online At: https://customcast.jp/, 2018, 17 pages including English Translation.
Office Action issued on Jan. 17, 2023, in corresponding Japanese patent Application No. 2020-072287, 7 pages.
Office Action issued on Jan. 17, 2023, in corresponding Japanese patent Application No. 2020-093438, 6 pages.
Office Action issued on Jan. 17, 2023, in corresponding Japanese patent Application No. 2020-078079, 6 pages.
Masatoshi Tokuoka, "[CEDEC 2019] "VTuber avatar that moves on its own when receiving a gift" session report. Two VTubers shake hands, grab shoulders, and hug each other, Experience acting support system using physics engine", 4gamer, Sep. 4, 2019, pp. 1-10, See English translation of the Japanese Office Action No. 2020-078079 issued on Jan. 17, 2023 for the explanation of the Statement of Relevancy. <URL:https://www.4gamer.net/games/999/G999905/20190904033/> [Search date: Dec. 28, 2022].
Japanese Office Action issued Feb. 13, 2024, in corresponding Japanese Patent Application No. 2021-208607, 8 pages.
Japanese Office Action issued Mar. 5, 2024, in corresponding Japanese Patent Application No. 2021-208605, 8 pages.

* cited by examiner

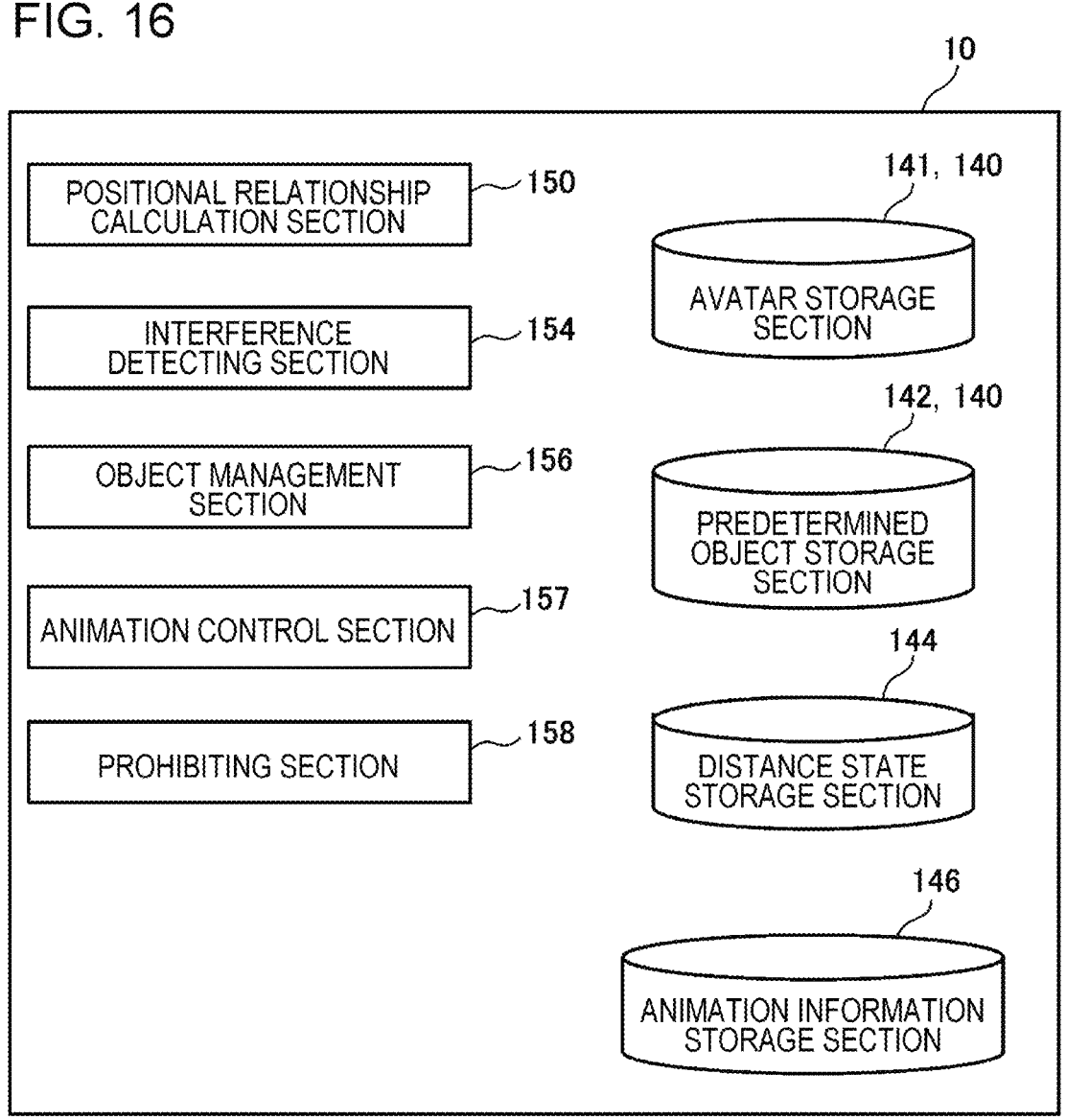

FIG. 19

| PREDETERMINED OBJECT ID | A01 | A02 | A03 | ... |
|---|---|---|---|---|
| B01 | FIRST STATE | SECOND STATE (NON-PROXIMITY) | SECOND STATE (PROXIMITY) | ... |
| B02 | SECOND STATE (NON-PROXIMITY) | SECOND STATE (NON-PROXIMITY) | FIRST STATE | ... |
| ... | ... | ... | ... | ... |

| PREDETERMINED OBJECT ID | RENDERING CONDITION | DATA ID |
|---|---|---|
| B01 | TRANSITION FROM NON-PROXIMITY TO PROXIMITY | D01 (A01), D01 (A02), ... |
| | ESTABLISH PARENT-CHILD RELATIONSHIP | D02 (A01), D02 (A02), ... |
| | ESTABLISH PARENT-CHILD RELATIONSHIP AND SATISFY PREDETERMINED CONDITION | D03 (A01), D03 (A02), ... |
| B02 | TRANSITION FROM NON-PROXIMITY TO PROXIMITY | * * * |
| | ESTABLISH PARENT-CHILD RELATIONSHIP CONCERNED WITH EXCLUSIVELY USED STATE | * * * |
| | ESTABLISH PARENT-CHILD RELATIONSHIP CONCERNED WITH SHARED STATE | * * * |
| ... | ... | ... |

2000

SYSTEM AND METHOD FOR USER VIRTUAL OBJECT CONTROLLING OTHER VIRTUAL OBJECTS TRIGGERING PREDETERMINED ANIMATIONS

CROSS-REFERENCE TO RELATED APPLICATIONS

This application claims priority to JP 2021-106393 filed in Japan on Jun. 28, 2021, the content of which is incorporated by reference in its entirety.

BACKGROUND

Conventional methods to recognize various states of user's hand (such as a state of pointing the finger at something, a state where the hand is open, a state where the hand is closed, a state where the hand is pinching something, a state where the hand is twisted, a shaking hand state, etc.) may use a tracking module. In such methods, information on a relatively large number of joints of the fingers of a hand is acquired by the tracking module in order to reflect minute movement of the hand as intended by the user into movement of a hand of a user avatar in a virtual space.

SUMMARY

In an exemplary implementation of the present application, an information processing system comprises a memory and processing circuitry. The memory stores object information relating to plural objects within a virtual space. The processing circuitry is configured to generate a display image by rendering the plural objects in the virtual space in accordance with the object information; acquire a user input of a user, the user input relating to a user object of the plural objects, the user object being associated with the user; determine a movement of the user object in the virtual space in accordance with the user input; generate positional relationship information that indicates a positional relationship in the virtual space between the user object and a predetermined object of the plural objects; store first rendering information for rendering a first animation with a combination of the predetermined object and the user object; and generate the first animation in accordance with the first rendering information in a case that a distance between the predetermined object and the user object is shorter than or equal to a predetermined distance according to the positional relationship information.

BRIEF DESCRIPTION OF THE DRAWINGS

FIG. 16 is a schematic block diagram showing a configuration concerned with an animation rendering function of various functions of a server apparatus;

FIG. 17 is a table illustrating an example of data in an avatar storage section;

FIG. 19 is a table illustrating an example of data in a distance state storage section;

FIG. 20 is a table illustrating an example of data in an animation information storage section;

DETAILED DESCRIPTION OF THE DRAWINGS

In conventional methods, increased processing loads are necessary in order to process the information acquired about the large number of joints of the fingers of a hand in order to reflect minute movement of the hand as intended by the user into movement of a hand of a user avatar in a virtual space. The inventors of the present disclosure have recognized that such increased processing load is problematic. Therefore, the inventors have developed the technology of the present disclosure to render minute movement of a user object in a virtual space without an excessive processing load.

Hereinafter, an embodiment will be described with reference to the accompanying drawings.

Outline of Virtual Reality Generating System

Figure 1:
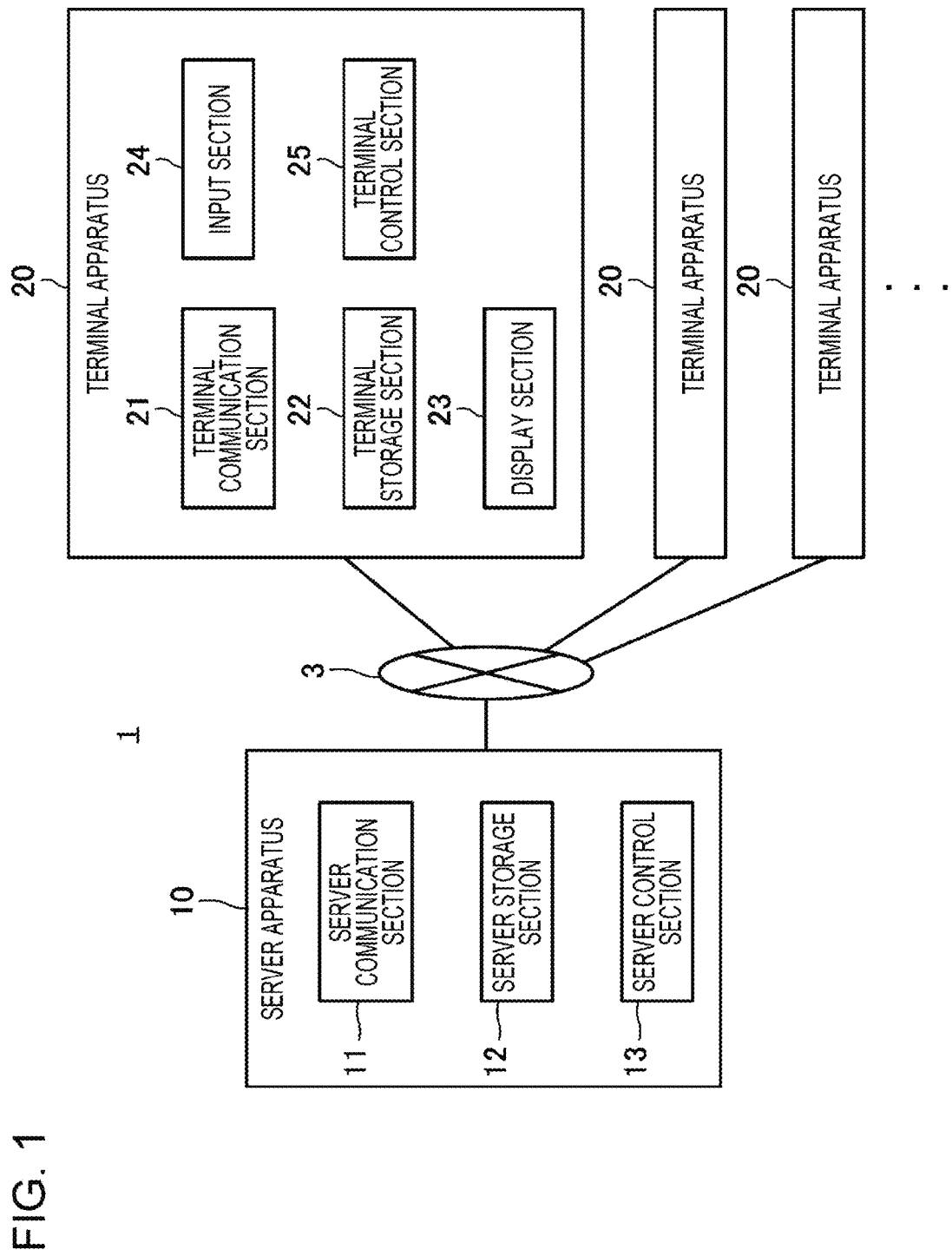
FIG. 1 is a block diagram of a virtual reality generating system according to an embodiment.

The outline of a virtual reality generating system 1 according to the embodiment of the present invention will be described with reference to FIG. 1. FIG. 1 is a block diagram of the virtual reality generating system 1 according to the present embodiment.

The virtual reality generating system 1 includes a server apparatus 10 and one or more terminal apparatuses 20. For the sake of convenience, FIG. 1 shows three terminal apparatuses 20. The number of the terminal apparatuses 20 can be one or more. In exemplary implementations, server apparatus 10 and each terminal apparatus may each include processing circuitry, the details of which will be discussed later with respect to FIG. 27.

The server apparatus 10 is an information processing system, such as a server, that is managed by, for example, an operator that provides one or more virtual realities. The terminal apparatus 20 is an apparatus that is used by a user, and is, for example, a mobile phone, a smartphone, a tablet terminal, a personal computer (PC), a head-mounted display, a game machine, or the like. A plurality of the terminal apparatuses 20 can be connected to the server apparatus 10 via a network 3, typically, in a mode different for every user.

The terminal apparatus 20 is capable of running a virtual reality application according to the present embodiment. The virtual reality application may be received by the terminal apparatus 20 from the server apparatus 10 or a predetermined application delivery server via the network 3, or may be stored in advance in a storage device provided in the terminal apparatus 20 or a storage medium, such as a memory card, that is readable by the terminal apparatus 20. The server apparatus 10 and the terminal apparatus 20 are communicably connected via the network 3. For example, the server apparatus 10 and the terminal apparatus 20 cooperate to execute various processes on virtual reality.

The terminal apparatuses 20 are connected so as to be communicable with each other via the server apparatus 10. Hereinafter, the phrase "one terminal apparatus 20 transmits information to another terminal apparatus 20" means that "one terminal apparatus 20 transmits information to another terminal apparatus 20 via the server apparatus 10". Similarly, the phrase "one terminal apparatus 20 receives information from another terminal apparatus 20" means that "one terminal apparatus 20 receives information from another terminal apparatus 20 via the server apparatus 10". However, in a modification, the terminal apparatuses 20 may be connected so as to be communicable with each other without intervening the server apparatus 10.

The network 3 may include a wireless communication network, the Internet, a virtual private network (VPN), a wide area network (WAN), a wired network, any combination of them, or the like.

Hereinafter, the virtual reality generating system 1 implements an example of the information processing system. Alternatively, the elements (see a terminal communication section 21, a terminal storage section 22, a display section 23, an input section 24, and a terminal control section 25 in FIG. 1) of a specific one of the terminal apparatuses 20 may implement an example of the information processing system, or a plurality of the terminal apparatuses 20 may cooperate to implement an example of the information processing system. Alternatively, the server apparatus 10 may solely implement an example of the information processing system, or the server apparatus 10 and one or more terminal apparatuses 20 may cooperate to implement an example of the information processing system.

Here, the outline of virtual reality according to the present embodiment will be described. The virtual reality according to the present embodiment is, for example, virtual reality or the like for any reality, such as education, trip, role playing, simulation, and entertainment including games and concerts, and virtual reality media like avatars are used while virtual reality is running. For example, the virtual reality according to the present embodiment is implemented by a three-dimensional virtual space, various virtual reality media that appear in the virtual space, and various contents to be provided in the virtual space.

The virtual reality media are electronic data to be used in the virtual reality. Examples of the virtual reality media include any media, such as cards, items, points, in-service currencies (or in-virtual reality currencies), tokens (for example, non-fungible tokens (NFTs)), tickets, characters, avatars, and parameters. The virtual reality media may include virtual reality-related information, such as level information, status information, parameter information (such as hit points and attack) or attribute information (skills, abilities, spells, jobs, and the like). The virtual reality media are electronic data that can be, for example, acquired, owned, used, managed, exchanged, synthesized, reinforced, sold, discarded, or presented in the virtual reality by users, and usage modes of the virtual reality media are not limited to those explicitly described in the specification.

In the present embodiment, users include audience users who watch various contents in a virtual space, and streaming users who stream specific contents (described later) in the virtual space via streamer avatars (described later).

Streaming users are able to watch specific contents provided by other streaming users as audience users, and audience users can also be able to stream specific contents as streaming users. Hereinafter, for the sake of avoiding a complicated description, audience users are assumed as audience users at that time, and streaming users are assumed as streaming users at that time. Hereinafter, streaming users and audience users may be referred to as "users" when not distinguished from each other. Streamer avatars and other user avatars may be simply referred to as "user avatars" when not distinguished from each other.

User avatars may typically have a form of a character with a front and have a form imitating a human, an animal, or that kind. User avatars can have various appearances (appearances when rendered) by being associated with various avatar items.

In the present embodiment, one user avatar is associated with one user. Therefore, one user and a user avatar associated with the one user are in a one-to-one correspondence relationship. Therefore, in the following description, user avatars may be synonymous with users, and users may be synonymous with user avatars. However, in a modification, a plurality of user avatars may be allowed to be associated with one user. In this case as well, when the number of user avatars used by one user in a virtual space is one at that time point, the one user and a user avatar associated with the one user are in a one-to-one correspondence relationship.

Audience users and streaming users basically put a wearable device on part of the head or face and view the virtual space via the wearable device. The wearable device may be a head-mounted display or a glass-type device. The glass-type device may be so-called augmented reality (AR) glasses or mixed reality (MR) glasses. In any case, the wearable device may be separated from the terminal apparatus 20 or may implement part or all of the functions of the terminal apparatus 20. In the present embodiment, the terminal apparatus 20 is assumed to be implemented by a head-mounted display as an example.

Hereinafter, specific contents provided by streaming users, of various contents provided by the server apparatus 10, will be mainly described. In the following description, contents that are suitably watched via a head-mounted display will be described.

Specific contents provided by streaming users mean contents in which a streamer avatar concerned with a streaming user, which changes its orientation, position, movement, and the like in response to the orientation, position, movement, and the like of the streaming user, appears in a virtual space. The orientation, position, and movement of a streaming user are concepts including not only the orientation, position, and movement of part or all of a body, such as the face, hand, and the like of the streaming user, but also the orientation, position, movement, or that kind of the line of sight of the streaming user. Specific contents provided by streaming users are typically video contents.

Specific contents provided by streaming users are to typically provide entertainment in any mode via streamer avatars. For example, specific contents provided by streaming users may be related to various performances, such as dancing, music, and magic, chattering, assembly, gathering, meeting, or that kind.

Alternatively, specific contents provided by streaming users may be education-oriented. For example, specific contents provided by streaming users may include guidance, advice, or the like from streaming users via streamer avatars. For example, guidance, advice, or the like from a dance instructor may be included as a content to be provided in virtual reality concerned with a dance lesson. In this case, a dance instructor is a streaming user, a student is an audience user, and the student is able to individually receive guidance from the instructor in the virtual reality.

Specific contents provided by streaming users may be streamed in form of collaboration by two or more streaming users (hereinafter, simply referred to as "collaboration streaming"). Thus, streaming in various modes is possible, and communication among streaming users is facilitated.

The server apparatus 10 is also capable of streaming contents other than specific contents provided by streaming users. Any type or any number of contents may be provided by the server apparatus 10 (any type or any number of contents may be provided in virtual reality). In the present embodiment, examples of the contents to be provided by the server apparatus 10 may include digital contents, such as various videos. Videos may be real-time videos or may be non-real-time videos. Videos may be videos based on real images or may be videos based on computer graphics (CG). Videos may be videos for information services. In this case, videos may be related to information services of specific genres (information services related to trip, living, foods, fashion, health, beauty, or the like), broadcast services provided by specific users (for example, YouTube (registered trademark)), or the like.

A mode of providing contents in virtual reality is various and may be other than a mode provided by using the display function of a head-mounted display. When, for example, the content is a video, the content may be provided by rendering a video on a display of a display device (virtual reality medium) in a virtual space. A display device in a virtual space is in any form and may be a screen installed in a virtual space, a large-screen display installed in a virtual space, a display of a mobile terminal in a virtual space, or the like.

Contents in virtual reality may be able to be watched by a method other than via a head-mounted display. For example, contents in virtual reality may be watched directly via a smartphone, a tablet, or the like (without intervening a head-mounted display).

Configuration of Server Apparatus

The configuration of the server apparatus 10 will be specifically described. The server apparatus 10 is made up of a server computer. The server apparatus 10 may be implemented by cooperation of a plurality of server computers. For example, the server apparatus 10 may be implemented by cooperation of a server computer that provides various contents, a server computer that implements various authentication servers, and the like. The server apparatus 10 may include a Web server. In this case, a browser may process HTML documents received from the Web server and various programs (JavaScript) associated with the HTML documents to implement one or some of the functions of the terminal apparatus 20 (described later).

As shown in FIG. 1, the server apparatus 10 includes a server communication section 11, a server storage section 12, and a server control section 13.

The server communication section 11 includes an interface that communicates with an external device in a wireless or wired manner and that exchanges information. The server communication section 11 may include, for example, a wireless local area network (LAN) communication module, a wired LAN communication module, and the like. The server communication section 11 is capable of exchanging information with the terminal apparatuses 20 via the network 3.

The server storage section 12 is, for example, a storage device and stores various pieces of information and programs used for various processes concerned with virtual reality.

The server control section 13 may include a dedicated microprocessor, or a central processing unit (CPU), a graphics processing unit (GPU), or the like that implements a specific function by reading a specific program. For example, the server control section 13 cooperates with the terminal apparatus 20 to run a virtual reality application in response to user operation to a display section 23 of the terminal apparatus 20.

Configuration of Terminal Apparatus

The configuration of the terminal apparatus 20 will be described. As shown in FIG. 1, the terminal apparatus 20 includes the terminal communication section 21, the terminal storage section 22, the display section 23, the input section 24, and the terminal control section 25.

The terminal communication section 21 includes an interface that communicates with an external device in a wireless or wired manner and that exchanges information. The terminal communication section 21 may include, for example, a wireless communication module that supports mobile communication standards, such as Long Term Evolution (LTE) (registered trademark), LTE-Advanced (LTE-A), a fifth-generation mobile communication system, and Ultra Mobile Broadband (UMB), a wireless LAN communication module, a wired LAN communication module, or the like. The terminal communication section 21 is capable of exchanging information with the server apparatus 10 via the network 3.

The terminal storage section 22 includes, for example, a primary storage device and a secondary storage device. For example, the terminal storage section 22 may include a semiconductor memory, a magnetic memory, an optical memory, or the like. The terminal storage section 22 stores various pieces of information and programs to be used in processes of virtual reality, received from the server apparatus 10. Information and programs to be used in processes of virtual reality may be acquired from an external device via the terminal communication section 21. For example, a virtual reality application program may be acquired from a predetermined application delivery server. Hereinafter, application programs are also simply referred to as applications.

The terminal storage section 22 stores data for rendering virtual spaces, for example, images and the like of indoor spaces like buildings and outdoor spaces. Multiple types of data for rendering a virtual space may be prepared for each virtual space and may be used according to a situation.

The terminal storage section 22 stores various images (texture images) to be projected onto various objects (texture mapping) placed in a three-dimensional virtual space.

For example, the terminal storage section 22 stores rendering information of user avatars respectively associated with users. Each user avatar is rendered in a virtual space in accordance with the rendering information of the user avatar.

The terminal storage section 22, for example, stores rendering information of various objects different from user avatars, such as various gift objects, buildings, walls, and non-player characters (NPCs). Various objects are rendered in a virtual space in accordance with the associated rendering information. A gift object is an object corresponding to a gift (present) from one user to another user and is part of items. A gift object may be something put on a user avatar (costume or accessory), something decorating a streaming image (fireworks, flowers, or the like), a background (wallpaper), or that kind, a ticket to turn a gacha (lottery) or that kind. The word "gift" used in the present application means a similar concept to the word "token". Therefore, the technology described in the present application may be understood while the word "gift" is replaced with the word "token".

The display section 23 includes, for example, a display device, such as a liquid crystal display and an organic electro-luminescence (EL) display. The display section 23 is capable of displaying various images. The display section 23 is made up of, for example, a touch panel, and functions as an interface that detects various user operations. As described above, the display section 23 may be incorporated in a head-mounted display.

The input section 24 may include a physical key and may further include any input interface, including a pointing device, such as a mouse. The input section 24 may be able to receive a noncontact user input, such as speech input, gesture input, and line-of-sight input. For gesture input, sensors for detecting various states of a user (an image sensor, an acceleration sensor, a distance sensor, and the like) or a sensor technology (for example, motion capture integrated with a depth sensor or a camera, a controller like a joypad, or the like) may be used. In the case of motion capture, position information (joint position information) and angle information (joint angle information) of various joints of a user may be acquired. Hereinafter, information that indicates both or any one of joint position information and joint angle information may be referred to as "joint information". In the case of image sensor, movement information of a movable area (for example, eye or mouth), other than the joints, of a user may be acquired. A camera for detecting a line of sight may be disposed in a head-mounted display. As described above, examples of various states of a user include the orientation, position, and movement, or that kind of a user. In this case, the orientation, position, and movement of a user are concepts including not only the orientation, position, and movement of the hands and body of a user but also the orientation, position, and movement, or that kind of the line of sight of a user.

The terminal control section 25 includes one or more processors. The terminal control section 25 controls the overall operation of the terminal apparatus 20.

The terminal control section 25 exchanges information via the terminal communication section 21. For example, the terminal control section 25 receives various pieces of information and programs to be used in various processes concerned with virtual reality from at least one of the server apparatus 10 and another external server. The terminal control section 25 stores the received information and programs in the terminal storage section 22. For example, a browser (internet browser) for connection with a Web server may be stored in the terminal storage section 22.

The terminal control section 25 launches a virtual reality application in response to user's operation. The terminal control section 25 cooperates with the server apparatus 10 to execute various processes concerned with virtual reality. For example, the terminal control section 25 causes the display section 23 to display a virtual space image. On a screen, for example, a graphic user interface (GUI) that detects user operation may be displayed. The terminal control section 25 is capable of detecting user operation via the input section 24. For example, the terminal control section 25 is capable of detecting various operations through gestures of a user (operations corresponding to tap operation, long tap operation, flick operation, swipe operation, and the like). The terminal control section 25 transmits operation information to the server apparatus 10.

Figure 2:
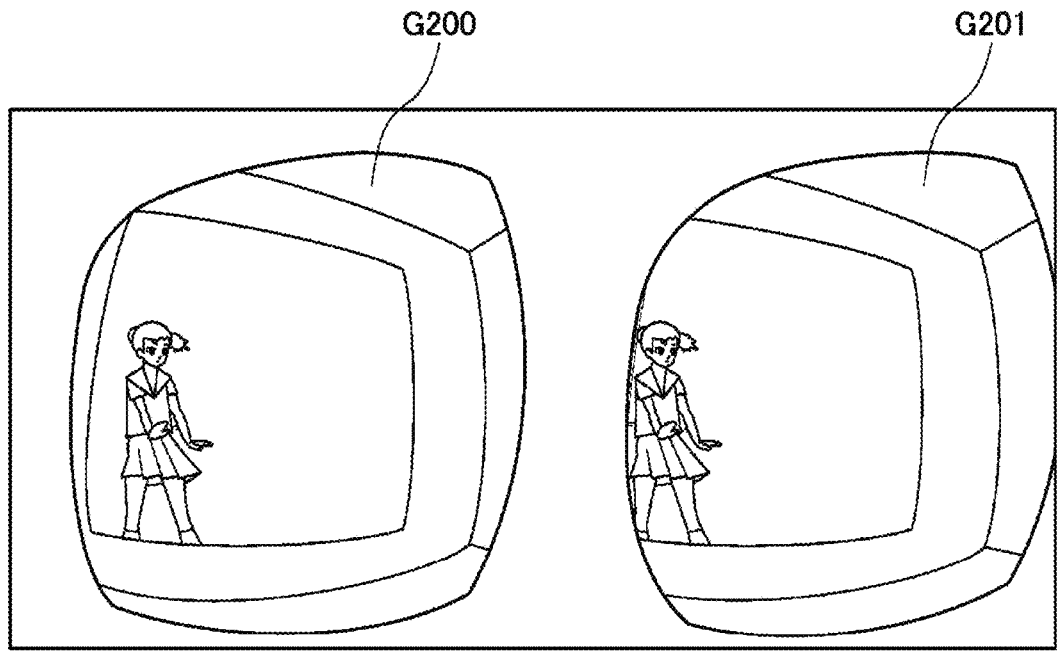
FIG. 2 is a view illustrating an example of a display image in a head-mounted display.

The terminal control section 25 renders a user avatar together with a virtual space (image) and causes the display section 23 to display the user avatar together with the virtual space (image). In this case, for example, as shown in FIG. 2, a stereoscopic vision image may be generated by generating images G201, G200 respectively visually recognized by right and left eyes. FIG. 2 schematically shows the images G201, G200 respectively visually recognized by the right and left eyes. Hereinafter, unless otherwise specified, a virtual space image means an overall image expressed by the images G201, G200. The terminal control section 25 implements various movements of the user avatar in the virtual space according to, for example, various operations made by a streaming user. A specific rendering process of the terminal control section 25 will be described in detail below.

Animation Rendering Function

In the present embodiment, a rendering process implements an animation rendering function of rendering an animation of a combination of a predetermined object with a user object when the distance between the predetermined object and the user object is shorter than or equal to a first predetermined distance d1. In this case, the animation is an animation prepared in advance and may be prepared for each predetermined object and each user object.

The following are practical examples in which drawing an animation of a combination of a predetermined object and a user object when the distance between the predetermined object and the user object becomes less than the first predetermined distance d1:

(1) When a user avatar approaches a chair and the distance between the user avatar and the chair falls below a predetermined distance, an animation of the avatar sitting on the chair is drawn and played. Two or more avatars may be applied, and two or more avatars may sit in one or more chairs together.

(2) When a user avatar approaches a transportation object (e.g. car, horse, elephant, etc.) and the distance between the user avatar and the transportation object falls below a predetermined distance, the avatar rides the transportation object and an animation of the transportation object moving forward is drawn and played. Two or more avatars may be applied, and two or more avatars may sit on the transportation object together.

(3) When a user avatar approaches a pit (hole, sudden lower elevation, etc.) and the distance between the user avatar and the pit falls below a predetermined distance, an animation of the avatar falling into the pit is drawn and played.

(4) When a user avatar approaches a musical instrument (e.g. a guitar) and the distance between the user avatar and the musical instrument falls below a predetermined distance, an animation of the avatar playing the musical instrument is drawn and played.

Predetermined objects are any objects of various objects that can be placed in a virtual space and are typically one or some of the various objects that can be placed in the virtual space. Alternatively, predetermined objects may be all the various objects that can be placed in a virtual space.

In the present embodiment, it is assumed that predetermined objects are objects that are able to be used (for example, objects that are able to be obtained) by a user avatar of various objects that can be placed in a virtual space as an example. For example, predetermined objects may include objects concerned with physical objects, such as a pen, that are able to be taken by a user avatar in its hand. However, physical objects corresponding to predetermined objects do not need to be present in reality, and may be physical objects present only in a virtual space. In the case of the configuration in which various objects that can be placed in a virtual space include gift objects, predetermined objects preferably include one or some or all of the gift objects.

The distance between a user object and a predetermined object is a distance in a virtual space (for example, a spatial distance) and may be calculated in accordance with position information of the predetermined object and position information of the user object. In this case, the position information of the predetermined object may be position information to be used at the time of placing the predetermined object in a virtual space and may be, for example, position information of a representative point (for example, a barycenter or a centroid) of the predetermined object. The position information of a user object may be position information of the hand of the user object. In this case, the position information of the hand of a user object may be position information of the tip end part of the hand of the user object. For example, in the case of the configuration in which joint position information of fingers and thumb is able to be acquired, the position information of the hand of a user object may be joint position information of the fingers and thumb. In the case of the configuration in which joint position information of fingers and thumb is not acquired and joint position information of a wrist is able to be acquired, the position information of the fingers and thumb of a user object may be joint position information of the wrist.

Hereinafter, unless otherwise specified, the hand of a user or the hand of a user object refers to a part corresponding to a palm, fingers, and a thumb beyond the wrist of the user or user object.

The first predetermined distance d1 is any distance and is a relatively small value and may be the same as a distance by which contact between a predetermined object and a user object is detected. The first predetermined distance d1 may be set according to the size of a predetermined object (an actual size in a virtual space, or a size on a virtual space image). For example, the first predetermined distance d1 may be set so as to reduce as the size of a predetermined object reduces. When the first predetermined distance d1 is set according to the size of a predetermined object on a virtual space image, the first predetermined distance d1 can be a different value for the same predetermined object.

Figure 3:
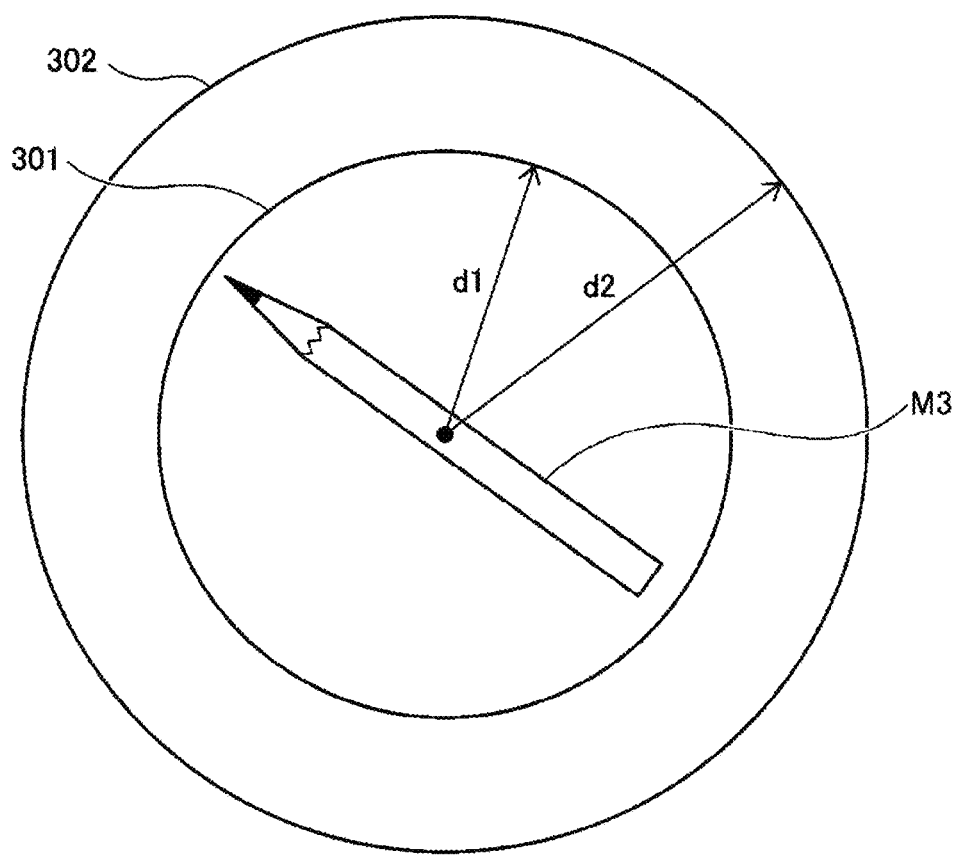
FIG. 3 is a view illustrating a first predetermined distance and a second predetermined distance concerned with a pencil object.

FIG. 3 is a view illustrating the first predetermined distance d1 and a second predetermined distance d2 concerned with a pencil object M3 that is an example of the predetermined object.

In the example shown in FIG. 3, a sphere 301 (illustrated by a two-dimensional circle in FIG. 3) that determines the first predetermined distance d1 concerned with the pencil object M3 is shown. The sphere 301 has a radius of the first predetermined distance d1, and the center of the sphere 301 is set at the centroid (representative point) of the pencil object M3. FIG. 3 also shows a sphere 302 (illustrated by a two-dimensional circle in FIG. 3) with a radius d2 (hereinafter, referred to as "second predetermined distance d2") greater than that of the sphere 301. The center of the sphere 302 is also set at the centroid (representative point) of the pencil object M3. The sphere 302 concerned with a radius of the second predetermined distance d2 will be described later.

An animation concerned with a combination of a predetermined object with a user object is any animation and is, for example, an animation that represents various movements of the hand, such as touching the predetermined object, holding the predetermined object, gripping the predetermined object, picking up the predetermined object, lifting the predetermined object, and pinching the predetermined object. An animation concerned with a combination of a predetermined object with a user object may be an animation concerned with one hand or may be an animation concerned with both hands.

An animation preferably relates to only a hand part in the entire user object. This is because a hand part has a large number of joints since there are fingers and a thumb and, when position information of joints is acquired by motion capture or the like and used, processing load tends to significantly increase.

Since an animation is prepared for each predetermined object, the type of an animation prepared for one-type predetermined object may be determined according to the property of the one-type predetermined object. When, for example, the predetermined object is an object corresponding to a physical object with a relatively large weight (for example, a barbel) in reality, an animation of a type in which "the predetermined object is lifted" with one hand does not need to be prepared.

An animation may also express a change in the movement, deformation, or the like of a predetermined object. This is because, depending on the type of a predetermined object, giving the movement of a predetermined object by handling the predetermined object with hand can be higher in consistency with reality. When, for example, the predetermined object corresponds to a bottle, a cup, a jug, or the like with beverage, an animation may express the movement of beverage (the movement when beverage is poured from a bottle into a cup or a jug, the movement of a liquid level in a cup according to the movement of a cup, generation of bubbles, or the like).

Figure 4:
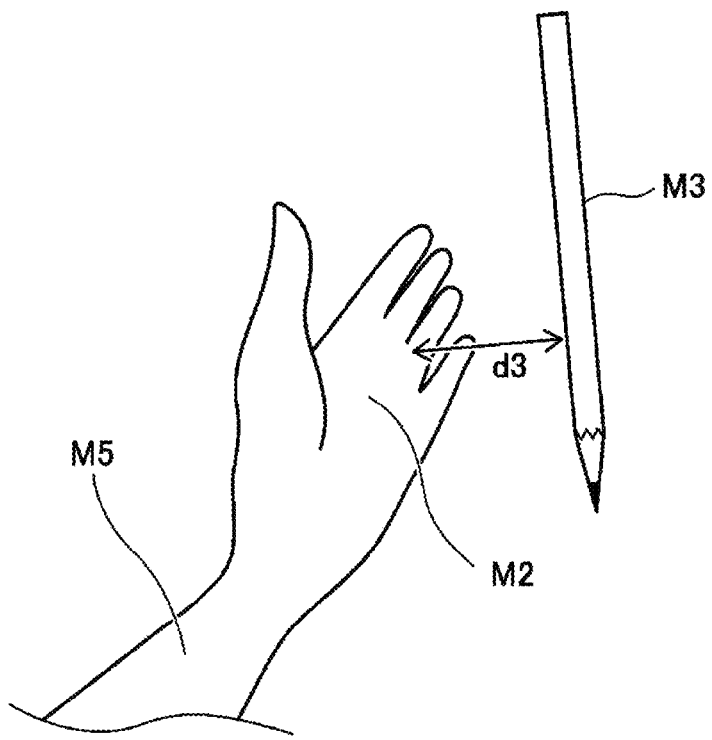
FIG. 4 is a view (part 1) illustrating an animation concerned with a combination of a pencil object with a user avatar.
Figure 5:
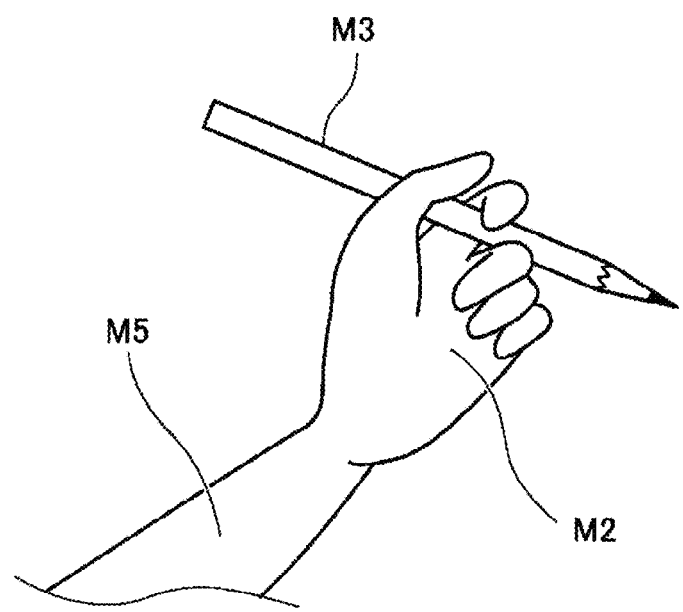
FIG. 5 is a view (part 2) illustrating an animation concerned with a combination of a pencil object with a user avatar.

FIGS. 4 and 5 are views illustrating an animation concerned with a combination of the pencil object M3 that is an example of the predetermined object with a hand part M2 of a user avatar.

FIG. 4 is a view showing the pencil object M3 and the hand part (hereinafter, also referred to as "hand part M2") of the user avatar in a virtual space image and is a view showing a state just before the distance between the pencil object M3 and the hand part M2 of the user avatar becomes shorter than or equal to the first predetermined distance d1. FIG. 5 is a view showing the pencil object M3 and the hand part M2 of the user avatar in the virtual space image and is a view showing a state just after the distance between the pencil object M3 and the hand part M2 of the user avatar becomes shorter than or equal to the first predetermined distance d1.

In the example shown in FIGS. 4 and 5, when the distance d3 between the pencil object M3 and the hand part M2 of the user avatar is shorter than or equal to the first predetermined distance d1 (see FIG. 3), an animation that the hand of the user avatar grips the pencil object M3 is rendered. FIG. 5 shows a state where the hand of the user avatar is gripping the pencil object M3. The animation may include an animation part from the state shown in FIG. 4 to the state shown in FIG. 5.

Here, animations as shown in FIGS. 4 and 5 are used to express the minute movement of each joint of the hand of a user avatar and are able to be rendered without acquiring the position information of each joint of a user by motion capture or the like. In other words, animations as shown in FIGS. 4 and 5 are generated in accordance with data (rendering data) prepared in advance, so it is not necessary to acquire the position information of each joint of a user by motion capture or the like.

In this way, according to the present embodiment, it is possible to render the minute motion of a user object in a virtual space without excessive processing load.

In another example situation, an avatar A of a person A may approach an avatar B of a person B. A base animation of a "hug" is displayed in association with invisible object as a target. Both arms of avatar A may be extended towards the invisible object (e.g. both shoulders of avatar B) as avatars A and B move towards each other, and then the "hug" animation is displayed with the aims of avatar A extended around the shoulders of avatar B.

In another example situation, both avatars A and B may extend arms towards each other at a same time. The arms of avatar A may be extended towards first invisible objects (shoulders of avatar B) and the arms of avatar B may be extended toward second invisible objects (chest/side of avatar B). The "hug" animation is then displayed with arms of avatar A extended around the shoulders of avatar B and the arms of avatar B extended around the shoulders of avatar A.

In another example situation, one arm of avatar A of a person A may be extended towards avatar B of a person B. A "shaking hands" animation may be displayed by the hand of the one arm of avatar A being interlocked with a hand on one arm of avatar B. The "shaking hands" animation may also be displayed in situation in which both avatars A and B each extend one arm toward one another, and the hands of the arms are then interlocked to display the "shaking hands" animation.

Figure 6:
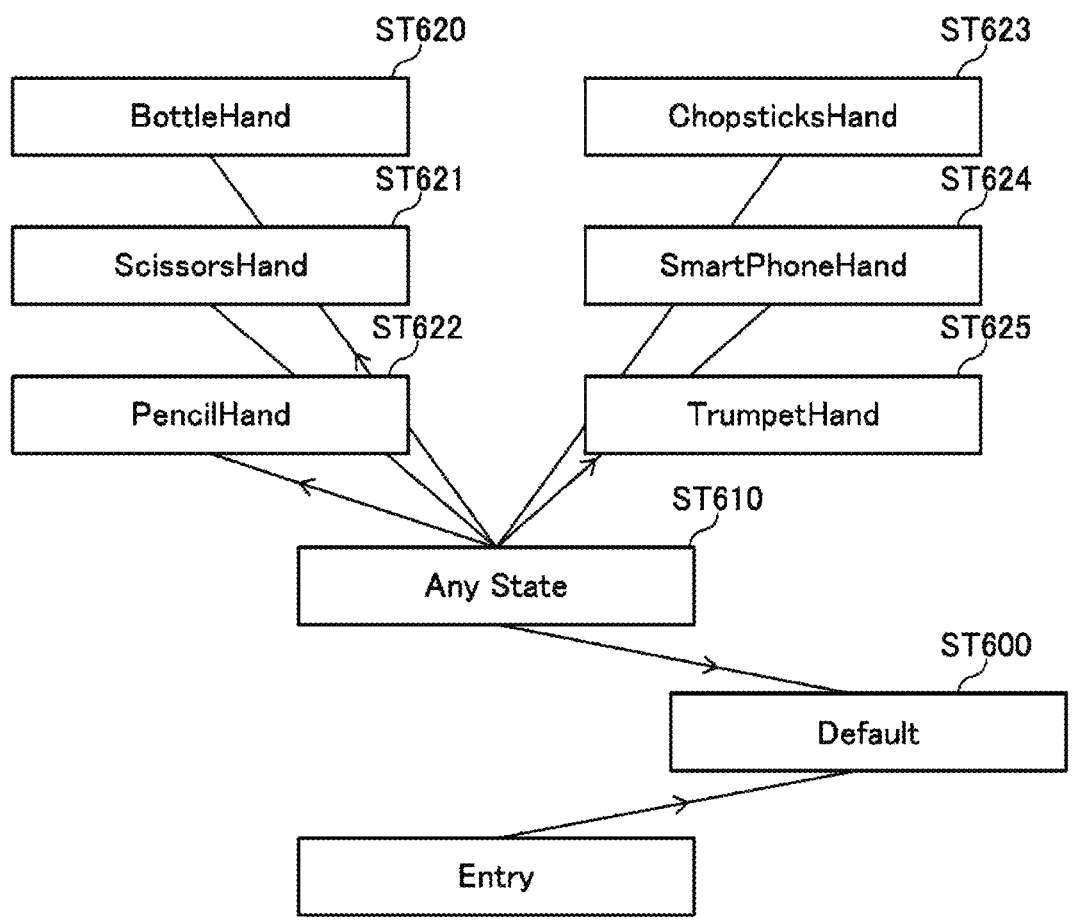
FIG. 6 is a view illustrating an example of a state machine suitably usable in the present embodiment.

FIG. 6 is a view illustrating an example of a state machine suitably usable in the present embodiment. In the example shown in FIG. 6, states ST600 to ST625 are shown as examples. The state ST600 corresponds to a default state ("Default") that is formed after a user avatar enters a virtual space (after entry), and the state ST610 corresponds to any state ("Any State") that indicates any state among the states ST620 to ST625. The states ST620 to ST625 are states accompanied by rendering an animation at the time of transition. For example, "PencilHand" is a state where the user avatar is gripping a pencil object (see FIG. 5) and corresponds to a state where the pencil object and the user avatar are in a parent-child relationship. In this state "PencilHand", when the distance between a bottle object that is a predetermined object and the hand part M2 of the user avatar becomes shorter than or equal to the first predetermined distance d1, the state transitions directly from the state "PencilHand" to the state "BottleHand" since the state is able to transition from "Any State" to the state "BottleHand". In this case, an animation reaching a state where the user avatar holds the bottle object.

By implementing changes of various animations using such a state machine, it is possible to easily increase variations of various animations. When, for example, an animation concerned with one predetermined object is newly added, it is possible to add the animation without influence on the existing animations by using a description in accordance with, for example, a transition from any state ("Any State"). Thus, it is possible to efficiently reduce design man-hours and to reduce processing load resulting from simplification of logic.

Next, an example of the configuration of the above-described virtual reality generating system 1 will be described in order with reference to FIG. 7 and the subsequent drawings.

Figure 7:
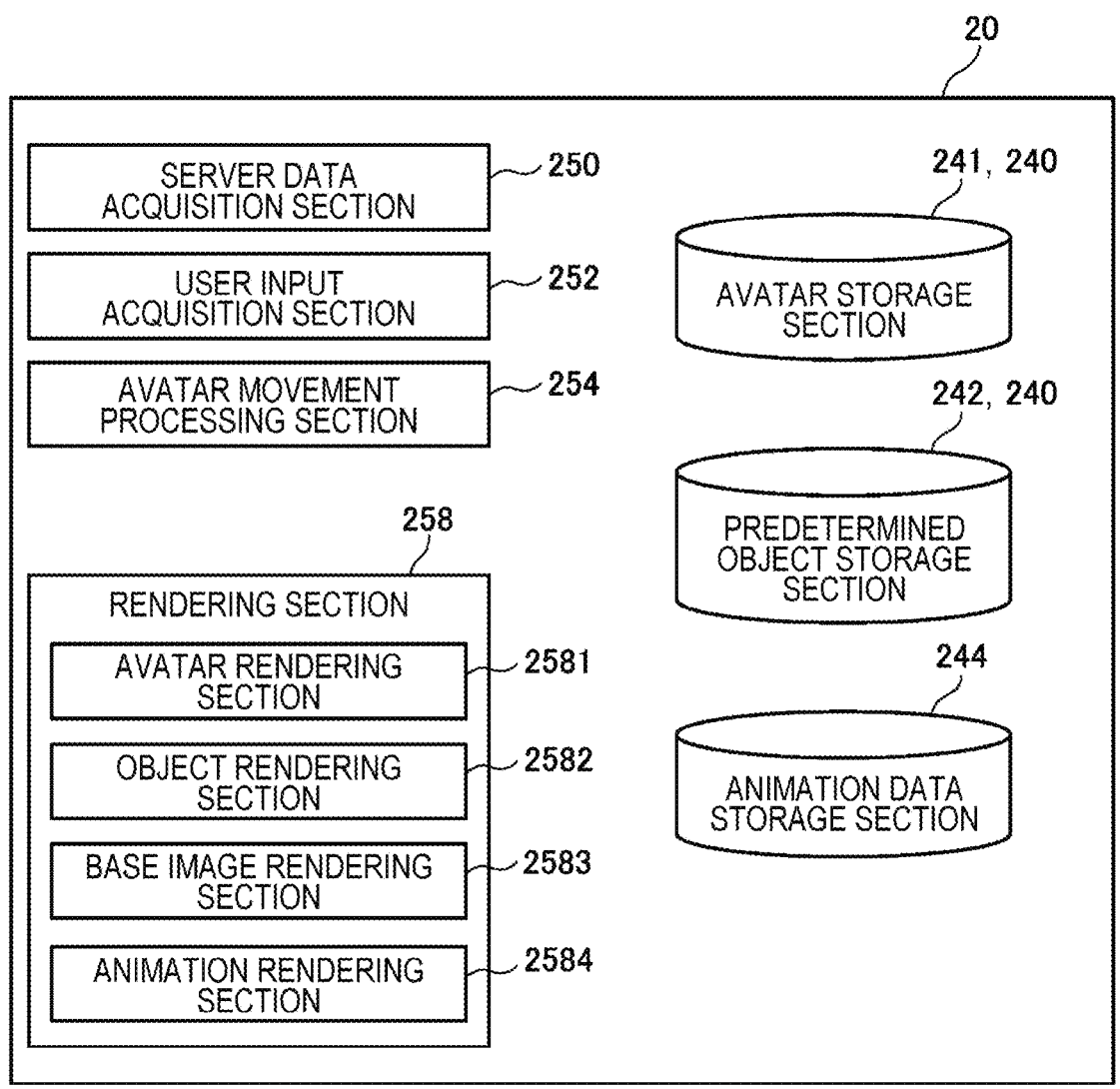
FIG. 7 is a schematic block diagram showing a configuration concerned with an animation rendering function of various functions of a terminal apparatus.
Figure 8:
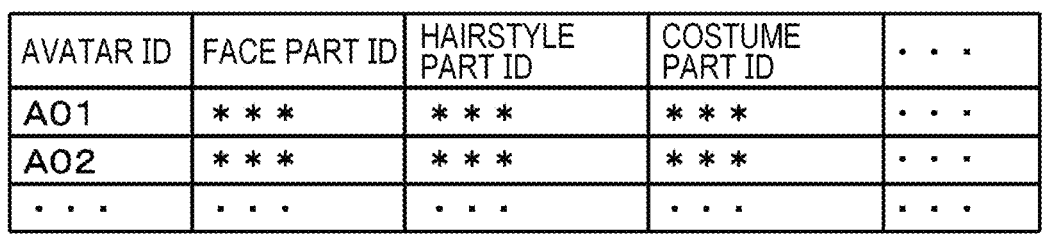
FIG. 8 is a table illustrating an example of data in an avatar storage section.
Figure 9:
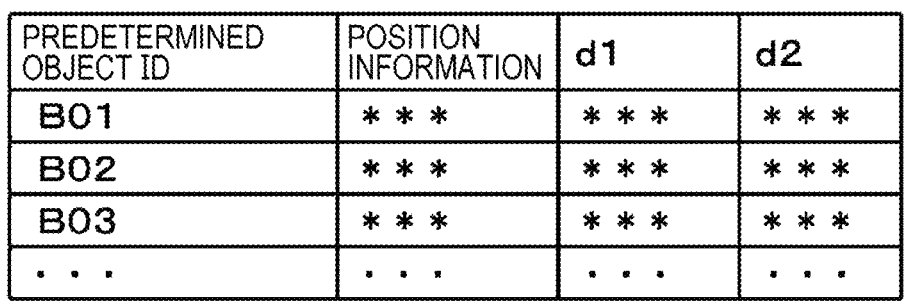
FIG. 9 is a table illustrating an example of data in a predetermined object storage section.
Figure 10:
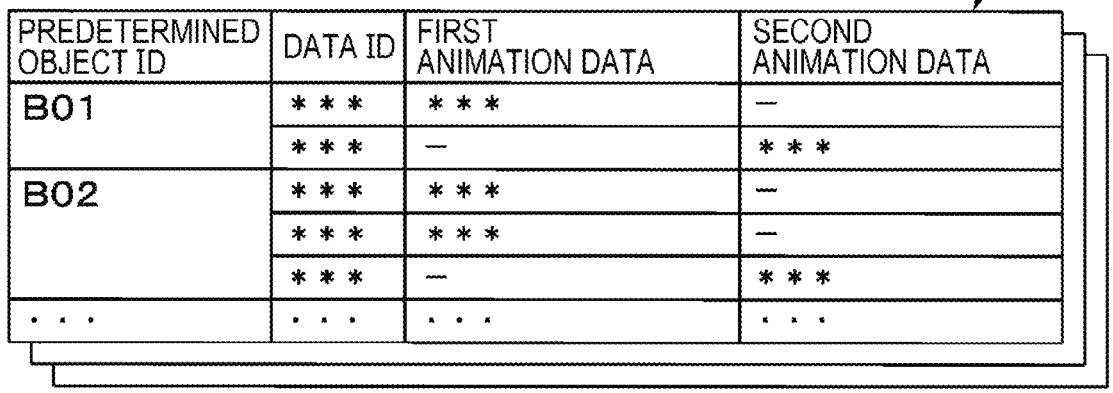
FIG. 10 is a table illustrating an example of data in an animation data storage section.
Figure 11:
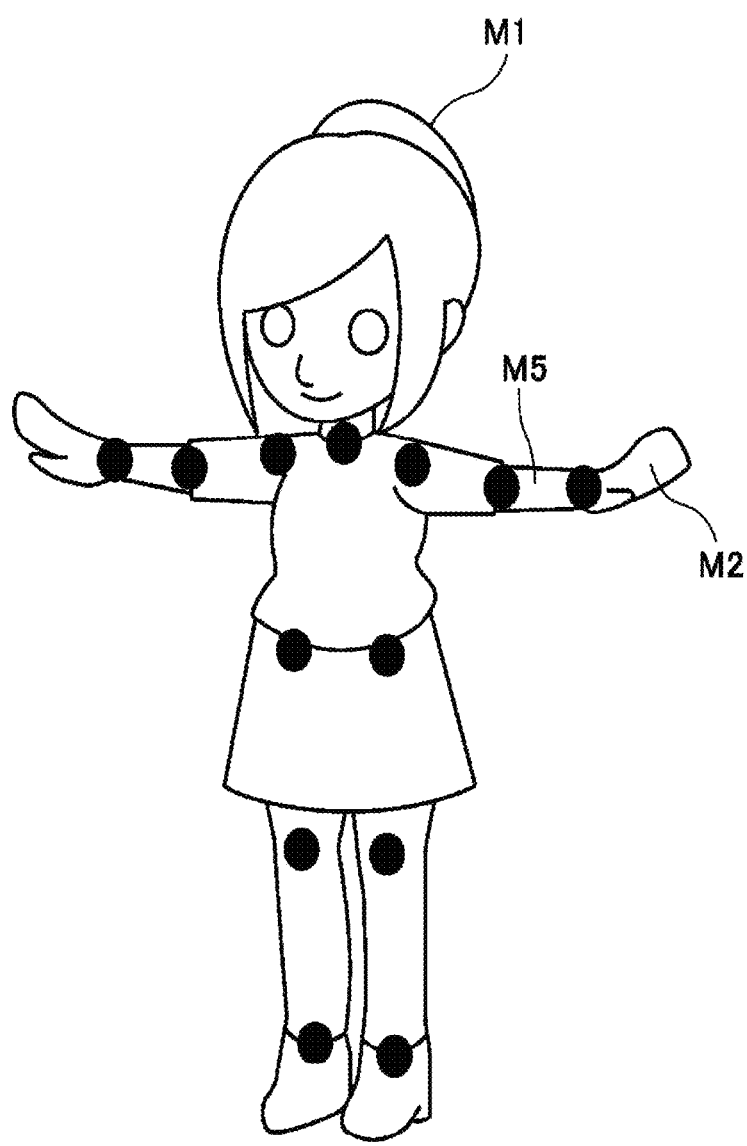
FIG. 11 is a view illustrating joint position information.

FIG. 7 is a schematic block diagram showing a configuration concerned with an animation rendering function of various functions of the terminal apparatus 20. FIG. 8 is a table illustrating an example of data in an avatar storage section 241. FIG. 9 is a table illustrating an example of data in a predetermined object storage section 242. FIG. 10 is a table illustrating an example of data in an animation data storage section 244. FIG. 11 is a view illustrating joint position information.

Hereinafter, one terminal apparatus 20 will be described; however, another terminal apparatus 20 may also be substantially the same. Hereinafter, a user means a user who uses the one terminal apparatus 20 unless otherwise specified, and a user avatar M1 means a user avatar M1 associated with the user or a streamer avatar in a streamer avatar in a streaming image H2 unless otherwise specified.

As shown in FIG. 7, the terminal apparatus 20 includes an object information storage section 240, the animation data storage section 244, a server data acquisition section 250, a user input acquisition section 252, an avatar movement processing section 254, and a rendering section 258.

The functions of the object information storage section 240 to the animation data storage section 244 are able to be implemented by the terminal storage section 22 of the terminal apparatus 20 shown in FIG. 1. The functions of the server data acquisition section 250 to the rendering section 258 are able to be implemented by the terminal control section 25 of the terminal apparatus 20 shown in FIG. 1 when the terminal control section 25 cooperates with the terminal communication section 21, the terminal storage section 22, the display section 23, and the input section 24 to run a virtual reality application.

The object information storage section 240 stores object information on various objects concerned with a virtual space. The object information storage section 240 includes the avatar storage section 241 and the predetermined object storage section 242.

The avatar storage section 241 stores various pieces of information for rendering the user avatar M1 (hereinafter, "rendering information of the user avatar M1"). In the example shown in FIG. 8, rendering information 800 of the user avatar M1 associates face part ID, hairstyle part ID, costume part ID, and the like with each avatar ID. Part information concerned with an appearance, such as face part ID, hairstyle part ID, and costume part ID, includes parameters for featuring the user avatar M1 and may be selected by an associated user. A plurality of types of information concerned with an appearance, such as face part ID, hairstyle part ID, and costume part ID, concerned with the user avatar M1 is prepared such that various selections are available to each user. For face part ID, part IDs are respectively prepared for the types of each of face shape, eye, mouth, nose, and the like. Information concerned with face part ID may be managed by combinations of IDs of parts that make up the face. In this case, it is possible to render each user avatar M1 on the terminal apparatus 20 side in accordance with IDs concerned with an appearance associated with the associated avatar ID.

The predetermined object storage section 242 stores various pieces of information on predetermined objects (hereinafter, also referred to as "object information"). In the example shown in FIG. 9, object information 900 associates position information, the first predetermined distance d1 (see FIG. 3), and the second predetermined distance d2 (see FIG. 3) with each predetermined object ID. Position information indicates the position (position in a virtual space) of an associated predetermined object and may be position information of the representative point of the predetermined object as described above. When the predetermined object is a movable object, the position information may be updated according to movement of the associated predetermined object. The first predetermined distance d1 and the second predetermined distance d2 are as described above with reference to FIG. 3. The first predetermined distance d1 and/or the second predetermined distance d2 may be the same for all the predetermined objects, and in this case, the object information 900 may be simplified.

The animation data storage section 244 stores data for rendering the above-described various animations (hereinafter, also referred to as "animation information"). Animation information 1000 shown in FIG. 10 shows animation information associated with a specific one user avatar M1. Animation information like the animation information 1000 shown in FIG. 10 may be prepared for each user avatar M1.

The animation information 1000 shown in FIG. 10 associates data IDs with each predetermined object ID. A data ID is an ID assigned to each animation data, and one data ID is uniquely associated with one specific animation data. In the animation information 1000 shown in FIG. 10, two data IDs are associated with predetermined object ID "B01", and the two data IDs are respectively associated with first animation data (an example of first rendering information) and second animation data (an example of second rendering information). Two data IDs concerned with first animation data are associated with predetermined object ID "B02". In an exemplary implementation, animation data includes motion data (data on how to move each part) of avatars and objects used to draw or render animations. Animation data may also include the implementation of drawing or rendering avatars and objects based on the motion data of the avatars and objects.

First animation data is data for rendering an animation (an example of a first animation) when the distance between a predetermined object and the user avatar M1 is shorter than or equal to the first predetermined distance d1. Second animation data is data for rendering an animation (an example of a second animation) when the distance between a predetermined object and the user avatar M1 is longer than the first predetermined distance d1 and shorter than or equal to the second predetermined distance d2. Second animation data may be omitted. In this case, instead of the second animation data, still image data that represents a predetermined posture of the hand (for example, a posture pointing the finger at a predetermined object) of the user avatar M1 may be used.

In the present embodiment, various pieces of animation data stored in the animation data storage section 244 of one terminal apparatus 20 may include various pieces of animation data concerned with the user avatar M1 associated with the user of the one terminal apparatus 20 and various pieces of animation data concerned with a streamer avatar. In other words, an animation is prepared for each user avatar M1, and various pieces of animation data stored in the animation data storage section 244 of one terminal apparatus 20 are data for rendering an animation prepared for the associated user avatar M1 and various streamer avatars. However, in a modification, an animation may be commonly used for one or more types of user avatars M1.

The server data acquisition section 250 acquires various pieces of information and data for implementing an animation rendering function on the terminal apparatus 20 side from the server apparatus 10. For example, the server data acquisition section 250 acquires various pieces of data and their update data to be stored in the object information storage section 240 and the animation data storage section 244 (and updated).

The user input acquisition section 252 acquires various inputs by the user via the input section 24. When a streaming image H2 is rendered, the user input acquisition section 252 acquires various inputs concerned with a streaming user. Various inputs via the input section 24 may be as described above. In the present embodiment, for example, the user input acquisition section 252 acquires joint information concerned with various joints of the user in accordance with motion capture. In this case, joint information relates to some joints of all the joints of the user. Specifically, in the present embodiment, joint information relates to joints other than the joints of the fingers and thumb of the user. For example, as shown in FIG. 11, joint information may be information on the joints of the neck, shoulders, elbows, wrists, hips, knees, ankles, and the like of the user. In this case, joint information may be in the form of a transformation of matrix (positions and angles) that represents a posture and a skeleton and transformed data of a mesh dependent on the matrix.

Alternatively, in another embodiment, joint information that is acquired by the user input acquisition section 252 may include joint information concerned with the joints of fingers and thumb of the user. However, in this case, joint information concerned with the joints of fingers and thumb of the user does not need to be used for rendering an animation. Alternatively, only part of joint information concerned with the joints of fingers and thumb of the user may be used in rendering an animation.

Hereinafter, for the sake of convenience of description, it is assumed that the user avatar M1 has various joints corresponding to various joints of the user. However, the positions, movements (movable range), and the like of various joints of the user avatar M1 do not need to completely agree with the positions, movements, and the like of a human and may be different as needed. In the example shown in FIG. 11, the user avatar M1 includes a plurality of parts coupled via joints (indicated by filled circles in FIG. 11), and the plurality of parts include a hand part M2 (an example of a first part) corresponding to the hand and body-side parts M5 (an example of a second part) including an arm part. The hand part M2 is coupled to the body-side parts M5 via a wrist joint. The number and locations of joints of the user avatar M1 may be set as needed.

The avatar movement processing section 254 determines the movement of the user avatar M1 in accordance with various inputs acquired by the user input acquisition section 252. The movement of the user avatar M1 is not limited to the overall movement and may also include the movement of one or some of the parts.

When the input acquired by the user input acquisition section 252 includes joint information, the avatar movement processing section 254 determines the posture and movement of the user avatar M1 in accordance with the joint information. In this case, the posture and movement of the user avatar M1 may be determined such that the position and/or angle of each joint of the user in a real-world coordinate system, indicated by the joint information, match the position and/or angle of each joint of the user avatar M1 in a virtual space coordinate system.

When the input acquired by the user input acquisition section 252 includes movement information concerned with a movable area (for example, mouth, eye, or the like) other than various joints of the user avatar M1, the avatar movement processing section 254 may determine the state (movement) of the movable area of the user avatar M1 in accordance with the movement information. In this case, the avatar movement processing section 254 may determine the state (movement) of the movable area of the user avatar M1 such that the state (movement) of the movable area of the user avatar M1 matches the movement information.

In the present embodiment, the avatar movement processing section 254 updates information indicating the position and orientation of the overall user avatar M1 and joint information concerned with various joints of the user avatar M1 as position/orientation information of the user avatar M1 in accordance with various inputs acquired by the user input acquisition section 252. The position of the overall user avatar M1 may be, for example, the position of the representative point (for example, the center of a body part, or any one joint) of the user avatar M1, and the orientation of the overall user avatar M1 may correspond to, for example, the front of the body part of the user avatar M1. The avatar movement processing section 254 may incorporate information indicating the determined state (movement) of the movable area of the user avatar M1 into the position/orientation information of the user avatar M1. In another embodiment, the avatar movement processing section 254 may directly use movement information acquired by the user input acquisition section 252 as information to be incorporated in the position/orientation information of the user avatar M1.

The rendering section 258 generates an image (hereinafter, also referred to as "terminal image") in the field of view of a virtual camera virtually disposed in a virtual space. A virtual camera may be set for each terminal apparatus 20.

Figure 12:
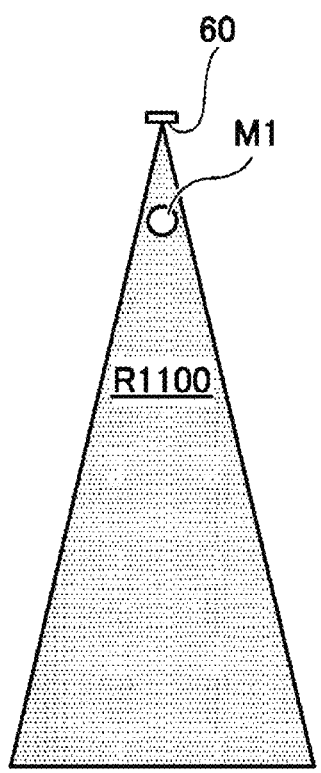
FIG. 12 is a view illustrating an example of a field of view of a virtual camera.

FIG. 12 is a view illustrating an example of the field of view of a virtual camera 60. FIG. 12 schematically shows the field of view of the virtual camera 60 with a hatching range R1100 in top view together with the user avatar M1 and the virtual camera 60 in a virtual space. The orientation of the virtual camera 60 is not necessarily horizontal (parallel to the field of the virtual space) and may be changed with various flexibilities. The position of the virtual camera 60 may also be changed with various flexibilities. Hereinafter, the field of view of the virtual camera 60 depends on the values of various camera parameters.

The rendering section 258 may operate to transition between a plurality of modes including a normal mode and an animation mode. The rendering section 258 includes an avatar rendering section 2581, an object rendering section 2582, a base image rendering section 2583, and an animation rendering section 2584.

The avatar rendering section 2581 renders a part concerned with the user avatar M1, of a terminal image as described above. Specifically, the avatar rendering section 2581 renders one or more user avatars M1 that can be located within the field of view of the virtual camera in accordance with the values of the camera parameters of the virtual camera 60, the position/orientation information of each user avatar M1, the rendering information 800 (see FIG. 8) of each user avatar M1, and the like. The user avatar M1 drawn by the avatar rendering section 2581 may be superposed on a base image (described later).

As described above, when the position/orientation information of one user avatar M1 includes information indicating the position and orientation of each of a plurality of parts of the user avatar M1, the avatar rendering section 2581 may express the position and orientation of each of the plurality of parts of the user avatar M1 in accordance with those pieces of information. Thus, it is possible to further naturally express the movement of the user avatar M1. When, for example, a specific part is an upper body, a movement of twisting the upper body with respect to a lower body can also be expressed.

As described above, when the position/orientation information of one user avatar M1 includes joint information concerned with various joints of the one user avatar M1, the avatar rendering section 2581 may render the user avatar M1 such that the states of the various joints of the user avatar M1 match the joint information.

As described above, when the position/orientation information of one user avatar M1 includes information indicating a movement concerned with a movable area (for example, mouth, eye, or the like) other than various joints of the one user avatar M1, the avatar rendering section 2581 may render the movable area of the user avatar M1 such that a corresponding movement of the movable area of the user avatar M1 is expressed in accordance with the information.

In the normal mode, the avatar rendering section 2581 renders the overall user avatar M1 including the hand part M2. On the other hand, in the animation mode in which the animation rendering section 2584 (described later) operates, the avatar rendering section 2581 does not render parts to be rendered by the animation rendering section 2584 and renders only parts not rendered by the animation rendering section 2584 (for example, body-side parts M5 other than the hand part M2).

As described above, with the configuration in which joint information concerned with the joints of fingers and thumb of a user is acquired, the avatar rendering section 2581 may render the hand part M2 of the user avatar M1 in accordance with the joint information concerned with the joints of the fingers and thumb of the user in the normal mode. However, in this case as well, the avatar rendering section 2581 renders only the parts not rendered by the animation rendering section 2584 (for example, the body-side parts M5 other than the hand part M2) without using (or using only part of) the joint information concerned with the joints of the fingers and thumb of the user in the animation mode.

Similarly, as described above, with the configuration in which the movement information of the movable area is acquired, the avatar rendering section 2581 may use the movement information of the movable area only in the normal mode. In other words, the avatar rendering section 2581 renders only the parts not rendered by the animation rendering section 2584 (for example, the body-side parts M5 other than the hand part M2) without using (or using only part of) the movement information of the movable area in the animation mode. However, when no movable area is included in the parts not rendered by the animation rendering section 2584, the avatar rendering section 2581 may render the movable area of the user avatar M1 in accordance with information indicating the movement of the movable area in the animation mode as well.

User avatars M1 to be rendered by the avatar rendering section 2581 may include another user avatar M1 associated with another user. In other words, when another user avatar M1 is located within the field of view from the virtual camera 60, the avatar rendering section 2581 may similarly render the another user avatar M1.

The object rendering section 2582 renders a predetermined object, of the terminal image as described above. Rendering information of each object may be stored in a storage section in a mode similar to that of the rendering information 800 (see FIG. 8) of the user avatars M1.

The object rendering section 2582 renders a predetermined object in accordance with the associated rendering information of the object in the normal mode. On the other hand, in the animation mode in which the animation rendering section 2584 (described later) operates, the object rendering section 2582 renders only a predetermined object not rendered by the animation rendering section 2584 without rendering a predetermined object to be rendered by the animation rendering section 2584, of the predetermined objects within the field of view of the virtual camera.

The base image rendering section 2583 renders a basic part of the terminal image as described above. In other words, the base image rendering section 2583 renders a basic part before images rendered by the avatar rendering section 2581, the object rendering section 2582, and the animation rendering section 2584 (described later) are superposed on the basic part. For example, the base image rendering section 2583 renders a field, a background, and the like within the field of view from the virtual camera 60 in accordance with the rendering information of a virtual space, the values of camera parameters of the virtual camera 60, and the like. The rendering information of a virtual space may be prepared in advance and may be, for example, updated later or dynamically. Any rendering method for a virtual space is possible. For example, the rendering method may be implemented by mapping a field object and a background object on an appropriate plane, curved surface, or the like.

In accordance with a command from the animation control section 157 of the server apparatus 10 (described later), the animation rendering section 2584 extracts animation data associated with a data ID included in the command from animation data (see FIG. 10) in the animation data storage section 244. The animation rendering section 2584 renders various animations as described above by referring to FIGS. 4 and 5 in accordance with the extracted animation data.

In the present embodiment, an animation relates to a combination of the predetermined object with the hand part M2 of the user avatar M1. In this case, the animation rendering section 2584 may perform rendering such that the animation of the hand part M2 is naturally coupled to the wrist joint of the user avatar M1 in accordance with the position and orientation of the wrist of the user avatar M1.

In the present embodiment, predetermined objects may include a gift object, and in this case, an animation may be rendered in a streaming image H2 (streaming image concerned with a specific content) provided by a streaming user.

Figure 13:
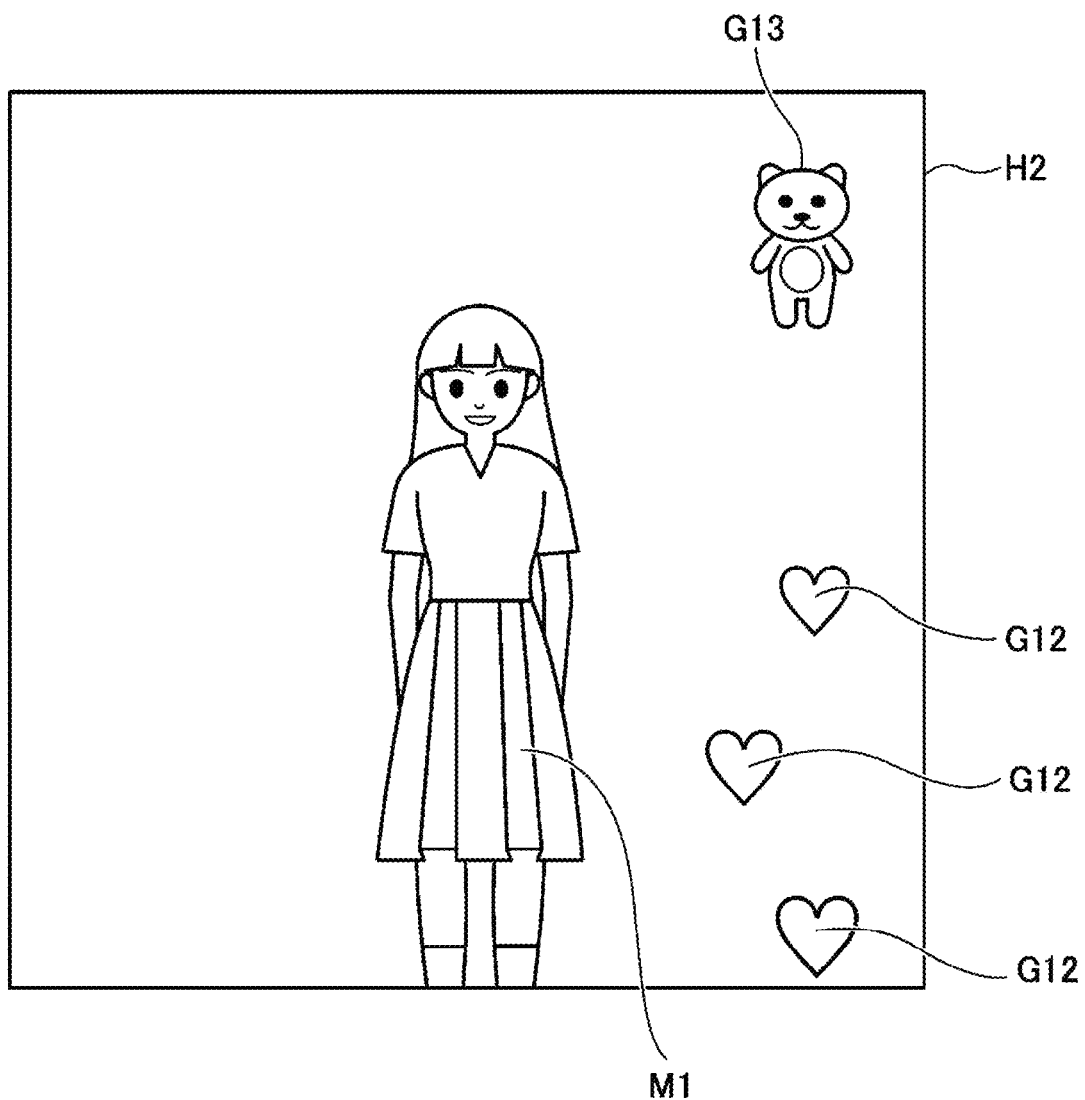
FIG. 13 is a view (part 1) illustrating an example of an animation concerned with a gift object.
Figure 14:
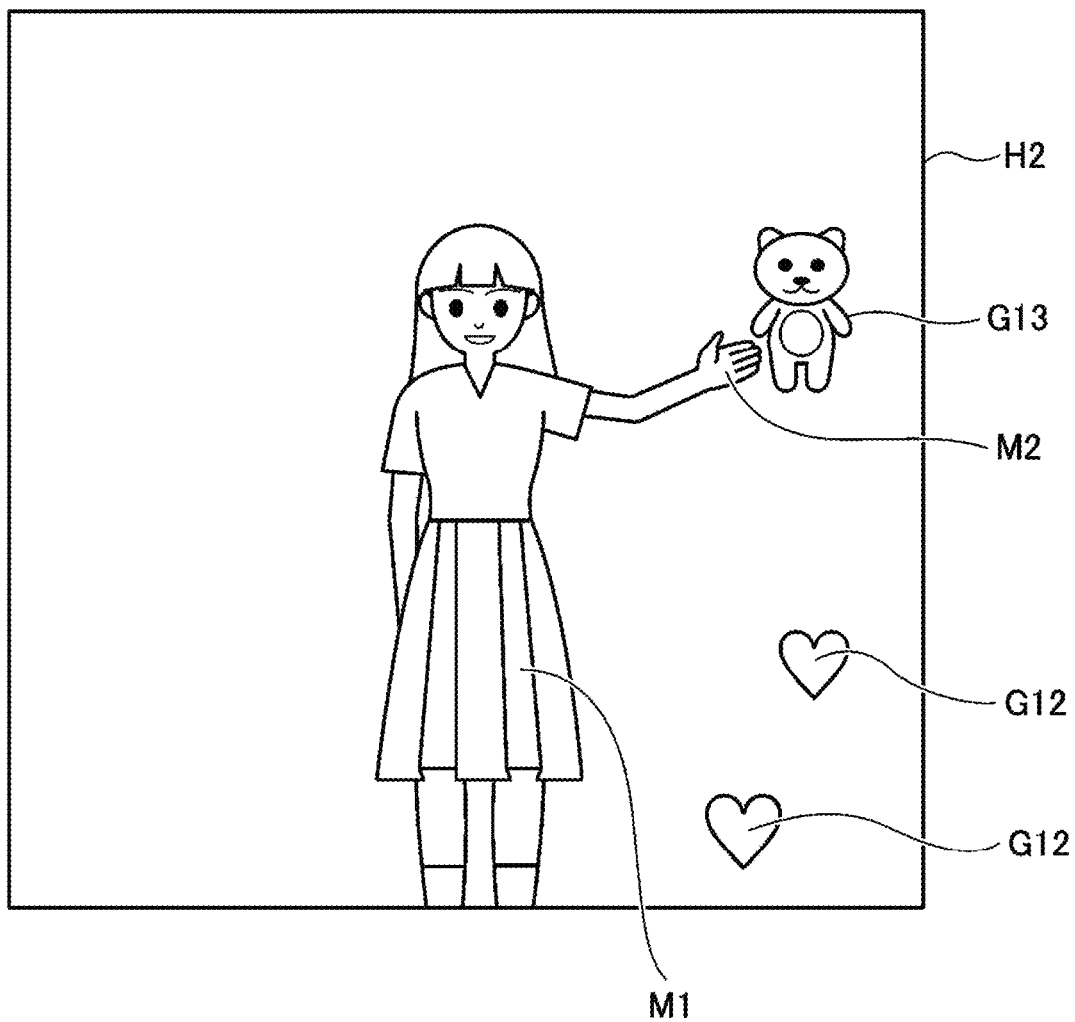
FIG. 14 is a view (part 2) illustrating an example of an animation concerned with a gift object.
Figure 15:
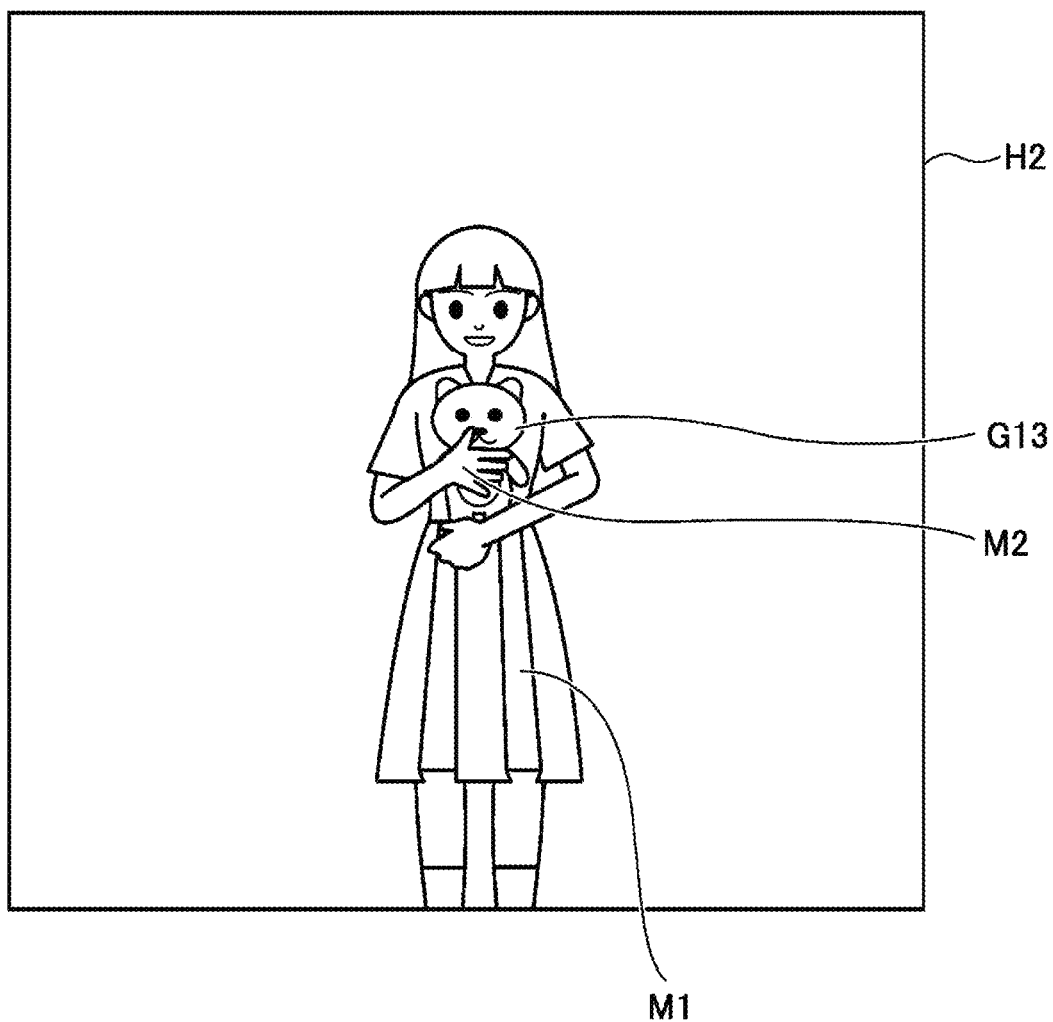
FIG. 15 is a view (part 3) illustrating an example of an animation concerned with a gift object.

For example, FIGS. 13 to 15 are views illustrating examples of an animation concerned with a gift object and are views showing examples of the streaming image H2. FIGS. 13 to 15 are streaming images H2 in order of time sequence and are views illustrating an animation for a stuffed toy gift object G13 (predetermined object) falling from above. As shown in FIG. 13, when the stuffed toy gift object G13 falls, the user avatar M1 that is a streamer avatar brings the hand part M2 close to the stuffed toy gift object G13 as shown in FIG. 14. Then, when the distance between the stuffed toy gift object G13 and the hand part M2 of the user avatar M1 becomes shorter than or equal to the first predetermined distance d1, an animation (an animation concerned with a combination of the user avatar M1 with the stuffed toy gift object G13) from catching the stuffed toy gift object G13 with the hand to holding the stuffed toy gift object G13 in its arms. FIG. 15 shows the user avatar M1 holding the stuffed toy gift object G13 in its arms as the last frame of the animation.

In the example shown in FIGS. 13 to 15, it is assumed that heart-shaped gift objects G12 are also predetermined objects. In this case, the distance between the hand part M2 of the user avatar M1 and each of the heart-shaped gift objects G12 does not become shorter than or equal to the first predetermined distance d1, and, therefore, an animation concerned with a combination of the user avatar M1 with the heart-shaped gift object G12 is not rendered (in this case, an animation is rendered in a mode in which the heart-shaped gift objects G12 fall under the influence of virtual gravity in the normal mode).

In the example shown in FIGS. 13 to 15, the stuffed toy gift object G13 is a predetermined object. When, for example, an object concerned with food like ramen is a predetermined object, a mode in which the user avatar M1 eats food with chopsticks, fork, or the like may be rendered as an animation concerned with the user avatar M1 and the object concerned with food. In this case, chopsticks, a fork, or the like may also be an item presented to the user avatar M1 as a gift object.

Figure 18:
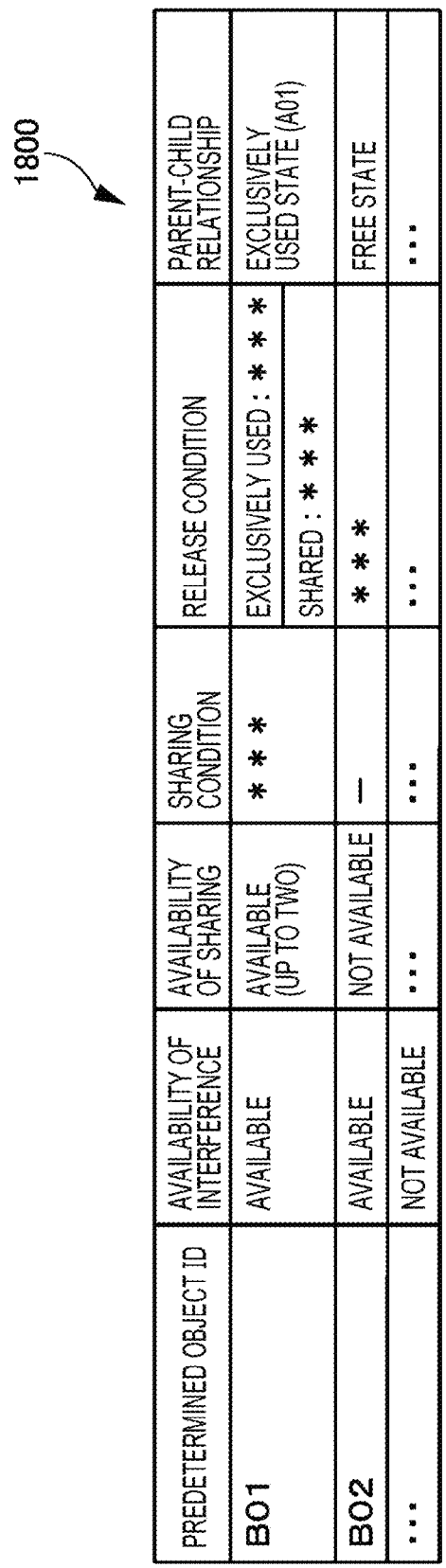
FIG. 18 is a table illustrating an example of data in a predetermined object storage section.

FIG. 16 is a schematic block diagram showing a configuration concerned with the above-described animation rendering function of various functions of the server apparatus 10. FIG. 17 is a table illustrating an example of data in an avatar storage section 141. FIG. 18 is a table illustrating an example of data in a predetermined object storage section 142. FIG. 19 is a table illustrating an example of data in a distance state storage section 144. FIG. 20 is a table illustrating an example of data in an animation information storage section 146.

As shown in FIG. 16, the server apparatus 10 includes an object information storage section 140, the distance state storage section 144, the animation information storage section 146, a positional relationship calculation section 150 (an example of an information generating section), an interference detecting section 154, an object management section 156, an animation control section 157, and a prohibiting section 158.

The object information storage section 140 to the animation information storage section 146 can be implemented by the server storage section 12 shown in FIG. 1, and the positional relationship calculation section 150 to the prohibiting section 158 can be implemented by the server control section 13 shown in FIG. 1. Some of the positional relationship calculation section 150 to the prohibiting section 158 (functional sections that perform communication with the terminal apparatus 20) can be implemented by the server communication section 11 together with the server control section 13 shown in FIG. 1.

The object information storage section 140 stores object information on various objects concerned with a virtual space. The object information storage section 140 includes the avatar storage section 141 and the predetermined object storage section 142.

The avatar storage section 141 may store the values of predetermined parameters of the user avatar M1 in addition to the original data of data to be stored in the avatar storage section 241 of the above-described terminal apparatus 20. The avatar information 1700 shown in FIG. 17 associates the values of predetermined parameters with each avatar ID. In FIG. 17, a power parameter indicating a power relationship among user avatars M1 and a priority parameter indicating a priority relationship among the user avatars M1 are illustrated as predetermined parameters. The value of power parameter and the value of priority parameter are associated with each user avatar M1. The value of power parameter and the value of priority parameter, associated with each user avatar M1, may be changeable. For example, the value of power parameter and the value of priority parameter, associated with one user avatar M1, may be increased according to the activity content (for example, an activity content in a virtual space, and the activity content contributes to other users) of the one user avatar M1. Alternatively, the value of power parameter and the value of priority parameter, associated with one user avatar M1, may be changed according to an avatar item associated with the one user avatar M1.

The avatar storage section 141 may store information on friend avatars (see the avatar information 1700 of FIG. 17). Information on friend avatars is information indicating that the degree of intimacy between associated user avatars M1 is higher than or equal to a threshold. In other words, friend information associated with one user avatar M1 is information indicating one or more user avatars M1 of which the degree of intimacy with the one user avatar M1 is higher than or equal to the threshold. A friend avatar may be added by registration made by the user. In this case, a user avatar M1 registered as a friend avatar for the one user avatar M1 may be treated as a user avatar M1 of which the degree of intimacy is higher than or equal to the threshold.

Here, the degree of intimacy may be able to be increased with, for example, the following method. According to the method, the degree of intimacy increases between users that are followers of each other, the degree of intimacy increases when collaboration streaming is performed multiple times, the degree of intimacy increases when a user sends many gifts, comments, likes, or the like during streaming of a streaming user, the degree of intimacy increases when a user has watched streaming of a streaming user for a long time, the degree of intimacy increases when a user exchanges a large number of messages with a streaming user other than during streaming, and the degree of intimacy increases when a user sends a large number of various items to a streaming user other than during streaming. In another embodiment, a threshold as to whether the degree of intimacy is higher than or equal to the threshold may be not a value, but the degree of intimacy may be determined to be higher than or equal to a threshold when a condition that the degree of intimacy increases as described above is satisfied.

The predetermined object storage section 142 stores information on availability of interference, information on availability of sharing, information on a sharing condition, information on a release condition, and setting information of a parent-child relationship for each predetermined object ID in addition to the source data of data stored in the predetermined object storage section 242 of the above-described terminal apparatus 20.

Information on availability of interference is information as to whether an associated predetermined object is a specific predetermined object. A specific predetermined object is a predetermined object of which object-to-object distances from two or more user avatars M1 do not become shorter than or equal to the first predetermined distance d1 at the same time. For example, a specific predetermined object may be an object that is able to be used by a specific user avatar. In a modification, a specific predetermined object may be omitted.

Information on availability of sharing is information indicating whether an associated predetermined object is able to be set to have a parent-child relationship with two or more user avatars M1. When an associated predetermined object is able to be set to have a parent-child relationship with two or more user avatars M1 (that is, when an associated predetermined object is available for sharing), associated information, such as the number of user avatars M1 available for sharing may be stored. For example, in object information 1800 shown in FIG. 18, the predetermined object of predetermined object ID "B01" is available for sharing, and the number of user avatars M1 available for sharing is up to two user avatars M1. The above-described specific predetermined object is not available for sharing. For example, availability of sharing may be set as needed according to the property of a predetermined object. For example, predetermined objects corresponding to a relatively small physical object like the pencil object M3, a physical object generally used by one person like a smartphone, and the like may be set to "not available for sharing". A predetermined object corresponding to a physical object or the like held by a plurality of persons, such as a rope for a tug of war, a knife for cutting cake in a ceremony, and a tape in a tape cut ceremony, may be set to "available for sharing".

Information on a sharing condition may be stored in association with a predetermined object available for sharing. Information on a sharing condition indicates a condition (sharing condition) to be satisfied when an associated predetermined object is shared among two or more user avatars M1. A sharing condition is any condition and may be satisfied for, for example, friend avatars or streamer avatars during collaboration streaming (that is, when the degree of intimacy is higher than or equal to a threshold). Alternatively, a sharing condition may be satisfied for user avatars M1 of which the above-described values of power parameters and/or the values of priority parameters are similar.

Information on a release condition is information indicating a basic condition to be satisfied at the time of cancelling a parent-child relationship. A release condition is any condition and may be, for example, satisfied in accordance with at least any one of a lapse of a predetermined time, a transition from a state where the object-to-object distance is shorter than or equal to the first predetermined distance d1 (first state (described later)) to a state where the object-to-object distance is longer than the first predetermined distance d1 (second state (described later)), and a cancellation input included in user input. A predetermined time may be set for each predetermined object according to the property of the predetermined object. A release condition may be set in different modes between in an exclusively used state and in a shared state in relation to a parent-child relationship (described later) (see predetermined object ID "B01" in FIG. 18).

Setting information of a parent-child relationship is information indicating a state (current state) of a parent-child relationship concerned with an associated predetermined object. Setting information of a parent-child relationship may include information indicating whether a parent-child relationship is set, and information identifying one or more parent user avatars M1 (for example, avatar IDs) when a parent-child relationship is set. In the case of a predetermined object available for sharing as described above, the number of parent user avatars M1 can be two or more when a parent-child relationship is set.

In the present embodiment, for example, setting information of a parent-child relationship concerned with one predetermined object includes state information indicating any one of a state where no parent-child relationship is set for any user avatar M1 (hereinafter, also referred to as "free state"), a state of a dependent object of one user avatar M1 (hereinafter, also referred to as "exclusively used state"), and a state of a dependent object of two or more user avatars M1 (hereinafter, also referred to as "shared state"). In this case, setting information of a parent-child relationship concerned with one predetermined object further includes information identifying one or more parent user avatars M1 (for example, avatar IDs) when the state information indicates an exclusively used state or a shared state.

The distance state storage section 144 stores information concerned with the distance between a user avatar and a predetermined object (hereinafter, also referred to as "object-to-object distance") for each predetermined object and each user avatar M1 (hereinafter, also referred to as "positional relationship information"). When a plurality of virtual spaces is set, positional relationship information may be managed for each virtual space. Predetermined objects and user avatars M1 included in positional relationship information in the distance state storage section 144 may be only predetermined objects and user avatars M1, each of which the object-to-object distance is calculated by the positional relationship calculation section 150 (described later).

Positional relationship information may be an object-to-object distance itself and/or information indicating the relationship between an object-to-object distance and the first predetermined distance d1 and/or the second predetermined distance d2.

Positional relationship information 1900 shown in FIG. 19 has a first state and a second state for each predetermined object ID and each user avatar M1. In the positional relationship information 1900 shown in FIG. 19, the second state includes a non-proximity state and a proximity state. The first state corresponds to a state where the object-to-object distance is shorter than or equal to the first predetermined distance d1, and the second state corresponds to a state where the object-to-object distance is longer than the first predetermined distance d1. The proximity state corresponds to a state where the object-to-object distance is longer than the first predetermined distance d1 and shorter than or equal to the second predetermined distance d2, and the non-proximity state corresponds to a state where the object-to-object distance is longer than the second predetermined distance d2. In a modification, states may be classified into further minute states or may be classified into only two states, that is, the first state and the second state.

The animation information storage section 146 stores control information for rendering the above-described various animations (hereinafter, also referred to as "animation control information"). In animation control information 2000 shown in FIG. 20, one or more rendering conditions and a data ID are associated with each predetermined object ID. A rendering condition indicates a condition to determine animation data based on which rendering is performed when multiple types of animation data are prepared for one predetermined object. For example, in the example shown in FIG. 20, multiple types of animation data (data IDs) are prepared for a predetermined object of predetermined object ID "B01", and respective rendering conditions are defined. As described above, a data ID is an ID assigned to each animation data, and one data ID is uniquely associated with one specific animation data. In FIG. 20, data ID "D01 (A01)" indicates an ID associated with animation data concerned with the user avatar M1 of avatar ID "A01".

For example, in the case of predetermined object ID "B01", animation data of data ID "D01" is associated with a transition from a non-proximity state to a proximity state (rendering condition). In this case, for example, when the positional relationship information concerned with the user avatar M1 of avatar ID "A01" and predetermined object ID "B01" transitions from a non-proximity state to a proximity state, the animation data of data ID "D01 (A01)" is rendered. In the case of predetermined object ID "B01", animation data of data ID "D02" is associated with establishing a parent-child relationship (rendering condition). In this case, when, for example, a parent-child relationship in which the predetermined object concerned with predetermined object ID "B01" becomes a dependent object of the user avatar M1 of avatar ID "A01" is established, the animation data of data ID "D02 (A01)" is rendered.

In the case of predetermined object ID "B01", different animation data is prepared further according to whether a predetermined condition is satisfied when a parent-child relationship is established. In this way, various rendering conditions may be set according to the type of associated animation data. When, for example, the predetermined object is an object imitating "sword", animation data of drawing the sword to cut and animation data of holding the sword over the head may be prepared. In this case, a predetermined condition concerned with animation data of drawing the sword to cut may be satisfied when a user input at the last predetermined timing is an input to issue instructions for "cutting". Similarly, a predetermined condition concerned with animation data of holding the sword over the head may be satisfied when a user input at the last predetermined timing is an input to issue instructions for "holding". The last predetermined timing may be a timing just before the distance between the predetermined object (object imitating a "sword") and the user avatar M1 becomes the first predetermined distance d1 (see FIG. 3) or may be, for example, a timing at which the distance between the predetermined object and the user avatar M1 becomes shorter than or equal to the second predetermined distance d2 (see FIG. 3).

The positional relationship calculation section 150 calculates the distance between the user avatar M1 and a predetermined object (that is, the object-to-object distance). In this case, predetermined objects for which the object-to-object distance is calculated may be not all the predetermined objects but only the predetermined objects positioned near the user avatar M1. For example, the predetermined objects for which the object-to-object distance concerned with one user avatar M1 is calculated may be limited to predetermined objects positioned within the movable range of the hand part M2 of the one user avatar M1. Thus, it is possible to efficiently reduce the load of calculating the object-to-object distance.

When predetermined objects include a gift object, the positional relationship calculation section 150 may calculate an object-to-object distance concerned with the gift object at the time when the gift object falls from above to below in a virtual space. Thus, a user avatar M1 (streamer avatar) to which a gift object is presented from another user (for example, an audience user) is able to implement an animation representing a movement to, for example, catch a falling gift object with the hand by bringing the hand close to the gift object.

In the present embodiment, the positional relationship calculation section 150 calculates the distance between the joint position of the wrist of the user avatar M1 and a predetermined object as an object-to-object distance. At this time, two object-to-object distances concerned with one predetermined object may be calculated in accordance with the joint positions of two wrists of the user avatar M1.

When the positional relationship calculation section 150 calculates an object-to-object distance concerned with each predetermined object as described above, the positional relationship calculation section 150 generates and updates data (see the positional relationship information 1900 in FIG. 19) in the distance state storage section 144. Specifically, when the positional relationship calculation section 150 calculates an object-to-object distance concerned with one predetermined object, the positional relationship calculation section 150 generates and updates information indicating the relationship between the object-to-object distance and the first predetermined distance d1 and/or the second predetermined distance d2 in accordance with the first predetermined distance d1 and the second predetermined distance d2 associated with the one predetermined object. The update timing may be synchronized with the calculation timing of the positional relationship calculation section 150.

In the present embodiment, since the first predetermined distance d1 and the second predetermined distance d2 are defined by a sphere (see FIG. 3) about the position of an associated predetermined object as described above, it is possible to efficiently reduce the calculation load to generate the positional relationship information 1900 as compared to, for example, the case where the first predetermined distance d1 and/or the second predetermined distance d2 varies according to a direction. However, in a modification, for one predetermined object, the first predetermined distance d1 and/or the second predetermined distance d2 may vary according to a direction (for example, the direction of the hand part M2 with respect to the predetermined object).

The interference detecting section 154 detects an interference state among two or more user avatars M1 for each predetermined object in accordance with data (see the positional relationship information 1900 in FIG. 19) in the distance state storage section 144. Specifically, the interference detecting section 154 detects an interference state (hereinafter, also referred to as "subsequent interference state" for the sake of differentiation) in accordance with the fact that the object-to-object distance of one or more user objects from one predetermined object that is a dependent object of another one or more user objects becomes shorter than or equal to the first predetermined distance d1.

The interference detecting section 154 may detect an interference state (hereinafter, also referred to as "concurrent interference state" for the sake of differentiation) in accordance with the fact that the object-to-object distances of two or more user objects from one predetermined object in a free state become shorter than or equal to the first predetermined distance d1 at the same time.

Figure 21:
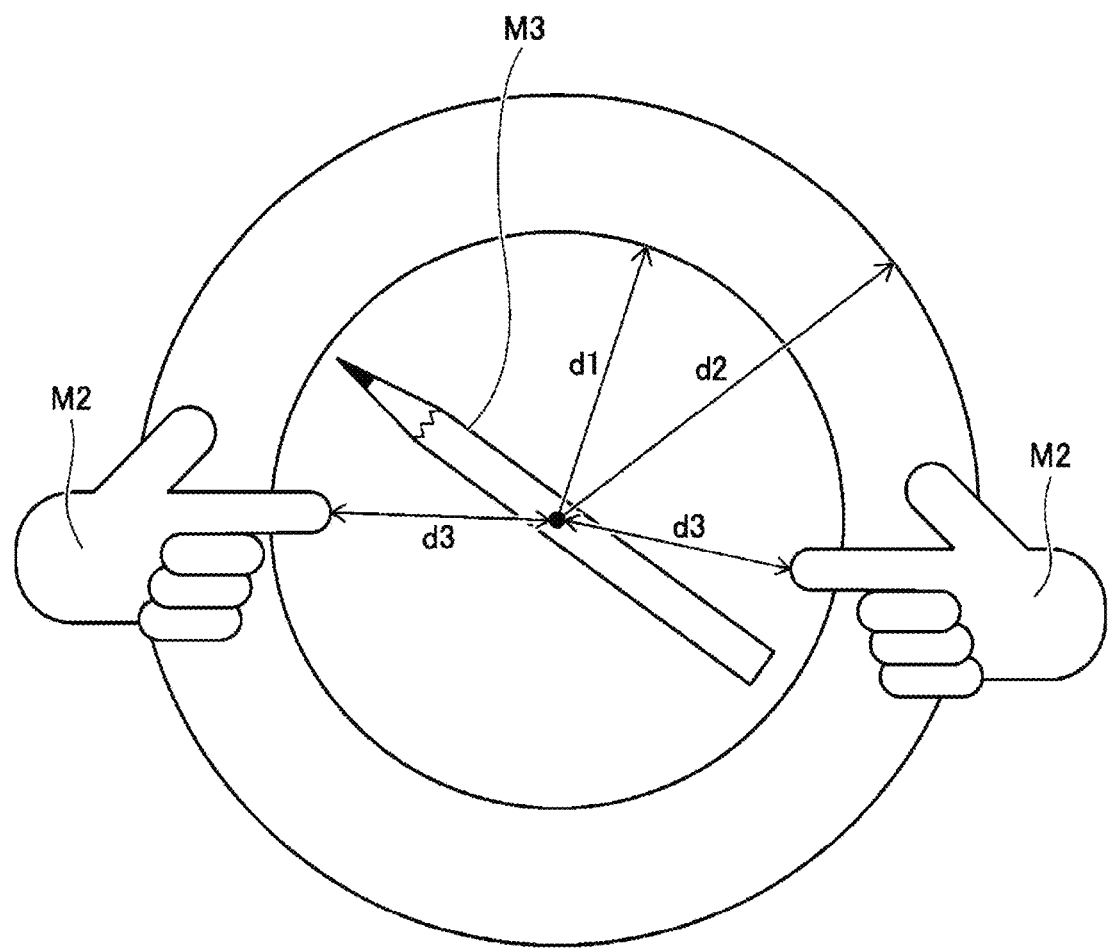
FIG. 21 is a view schematically showing an interference state detected by an interference detecting section.

FIG. 21 schematically shows an interference state to be detected by the interference detecting section 154. In this case, the hand parts M2 respectively concerned with two user avatars M1 are close to the pencil object M3 that is a predetermined object within the range shorter than or equal to the first predetermined distance d1 (that is, (Distance d3) (First Distance d1)), and the concurrent interference state may be detected.

Hereinafter, in the case of the subsequent interference state, two or more user avatars M1 that establish an interference state for one predetermined object include one or more user avatars M1 of which the one predetermined object is a dependent object and another one or more user avatars M1 of which the object-to-object distance from the one predetermined object newly becomes shorter than or equal to the first predetermined distance d1. In the case of the concurrent interference state, two or more user avatars M1 that establish an interference state for one predetermined object are user avatars M1 of which the object-to-object distance from the one predetermined object is shorter than or equal to the first predetermined distance d1.

The object management section 156 manages and adjusts (solves) a parent-child relationship (an example of a master-slave relationship) among various objects. In the present embodiment, the object management section 156 manages a parent-child relationship for each predetermined object. The object management section 156 updates setting information of the parent-child relationships in the predetermined object storage section 142 in accordance with positional relationship information in the distance state storage section 144, results of interference states, detected by the interference detecting section 154, and the like.

For example, for one predetermined object in a free state, when positional relationship information with respect to one user avatar M1 transitions from the second state to the first state (that is, the object-to-object distance becomes shorter than or equal to the first predetermined distance d1), the object management section 156 sets a parent-child relationship between the one predetermined object and the one user avatar M1. In other words, the object management section 156 updates the setting information of the parent-child relationship concerned with the one predetermined object from information indicating the free state to information indicating an exclusively used state (an example of a first relationship) by the one predetermined object.

When the object management section 156 updates the setting information of the parent-child relationship concerned with one predetermined object from information indicating the free state to information indicating the exclusively used state by one user avatar M1, the object management section 156 maintains the updated setting information of the parent-child relationship (information indicating the exclusively used state by the one user avatar M1) until a predetermined cancellation condition is satisfied. In this case, the object management section 156 monitors whether the predetermined cancellation condition concerned with the one predetermined object is satisfied.

The predetermined cancellation condition is satisfied when the above-described release condition is satisfied by consulting FIG. 18. The release condition is as described above and may be prescribed in the predetermined object storage section 142. In the present embodiment, the predetermined cancellation condition can be satisfied by sharing the one predetermined object with another user avatar M1, transferring the one predetermined object to another user avatar M1, or the like as will be described later.

When the predetermined cancellation condition concerned with the one predetermined object is satisfied, the object management section 156 updates the setting information of the parent-child relationship concerned with the one predetermined object (the setting information of the parent-child relationship in the predetermined object storage section 142) accordingly.

In the present embodiment, the object management section 156, for example, adjusts the parent-child relationship concerned with one predetermined object in accordance with a result detected by the interference detecting section 154.

Specifically, when the interference state concerned with one predetermined object has been detected by the interference detecting section 154, the object management section 156 may adjust the parent-child relationship concerned with the one predetermined object in accordance with information on availability of sharing of the one predetermined object (see the object information 1800 in FIG. 18). When, for example, one predetermined object of which the interference state has been detected by the interference detecting section 154 is not available for sharing, the parent-child relationship concerned with the one predetermined object may be adjusted such that any one of two or more user objects becomes a parent in accordance with the value of a predetermined parameter indicating the relationship among two or more user objects that establish the interference state. The predetermined parameter is as described above with reference to FIG. 17. For example, a parent-child relationship concerned with the one predetermined object may be adjusted in accordance with the value of a power parameter indicating a power relationship among two or more user objects. In this case, the parent-child relationship concerned with the one predetermined object may be adjusted such that, of two or more user objects, the user object of which the value of power parameter is the largest becomes a parent of the one predetermined object. The parent-child relationship concerned with the one predetermined object may be adjusted such that, of two or more user objects, the user object of which the value of priority parameter is the largest becomes a parent of the one predetermined object.

On the other hand, when one predetermined object of which the interference state has been detected by the interference detecting section 154 is available for sharing, the object management section 156 may determine whether a sharing condition (see the object information 1800 in FIG. 18) is satisfied. In this case, when the sharing condition is satisfied, the setting information of the parent-child relationship concerned with the one predetermined object is updated with information representing a shared state (an example of a second relationship). At this time, when the setting information of the parent-child relationship concerned with the one predetermined object before the update indicates an exclusively used state by any one of two or more user objects that establish the interference state, the predetermined cancellation condition is satisfied.

When the sharing condition is not satisfied, the object management section 156 determines whether the predetermined cancellation condition concerned with the one predetermined object is satisfied in accordance with the value of predetermined parameter indicating the relationship among two or more user objects that establish the interference state. In this case, when the value of power parameter of the user avatar M1 that has been a parent just before the interference state is detected is greater than the value of power parameter of another user avatar M1 that has established the interference state, the predetermined cancellation condition due to the interference state may be configured not to be satisfied. In this case, an exclusively used state by the user avatar M1 that has been a parent just before the interference state is detected is maintained. On the other hand, when the value of power parameter of the user avatar M1 that has been a parent just before the interference state is detected is less than the value of power parameter of another user avatar M1 that has established the interference state, the predetermined cancellation condition due to the interference state may be configured to be satisfied. In this case, the object management section 156 updates the setting information of the parent-child relationship concerned with the one predetermined object (the setting information of the parent-child relationship in the predetermined object storage section 142) with information indicating an exclusively used state by the user object of which the value of power parameter is greater. Here, adjustment based on power parameter has been described, and adjustment based on priority parameter may also be similarly performed.

When the interference state concerned with one predetermined object in a shared state among two or more user avatars M1 has been detected by the interference detecting section 154, the object management section 156 may similarly determine whether the predetermined cancellation condition concerned with the one predetermined object is satisfied in accordance with the value of predetermined parameter indicating the relationship among two or more user objects that establish the interference state. In this case, when each of the values of power parameters of two or more user avatars M1 that have been parents just before the interference state is detected is greater than the value of power parameter of another user avatar M1 that has established the interference state, the predetermined cancellation condition due to the interference state may be configured not to be satisfied. In this case, a shared state by the two or more user avatars M1 that have been parents just before the interference state is detected is maintained. On the other hand, when at least one of the values of power parameters of two or more user avatars M1 that have been parents just before the interference state is detected is less than the value of power parameter of another user avatar M1 that has established the interference state, the predetermined cancellation condition due to the interference state may be configured to be satisfied. In this case, the object management section 156 updates the setting information of the parent-child relationship concerned with the one predetermined object (the setting information of the parent-child relationship in the predetermined object storage section 142) with information indicating a shared state by a predetermined number of user objects in descending order of the value of power parameter. Here, adjustment based on power parameter has been described, and adjustment based on priority parameter may also be similarly performed.

Further details of the adjustment method by the object management section 156 will be described later with reference to FIGS. 23 to 26.

The animation control section 157 operates with the above-described object management section 156 to control the operation of the animation rendering section 2584 of the rendering section 258 in the terminal apparatus 20. When the animation control section 157 causes the rendering section 258 to render an animation, the animation control section 157 issues a rendering command including a data ID concerned with animation data to be rendered, to the animation rendering section 2584. When the animation control section 157 stops rendering of an animation, the animation control section 157 issues a stop command to the animation rendering section 2584.

The animation control section 157 monitors whether a rendering condition (see the animation control information 2000 in FIG. 20) is satisfied for each predetermined object in accordance with data in the animation information storage section 146. When the rendering condition is satisfied for one predetermined object, the animation control section 157issues a rendering command including an associated data ID to the animation rendering section 2584 of the terminal apparatus 20 associated with the user avatar M1 that has a parent-child relationship with the one predetermined object (for example, the terminal apparatus 20 rendering a terminal image including the user avatar M1).

When one animation is started, the animation control section 157 monitors a change in parent-child relationship concerned with a predetermined object to be rendered by the one animation (a change in parent-child relationship resulting from fulfillment of the predetermined cancellation condition) and, when there occurs a change in parent-child relationship, controls the animation accordingly. When, for example, the parent-child relationship changes from an exclusively used state to a free state, the animation control section 157 issues a stop command to stop rendering of an animation to the animation rendering section 2584. In this case, instead of a stop command, a rendering command including a data ID concerned with another animation data to be rendered (for example, in the case of the pencil object M3, animation data releasing the pencil object M3) may be issued to the animation rendering section 2584.

Figure 22:
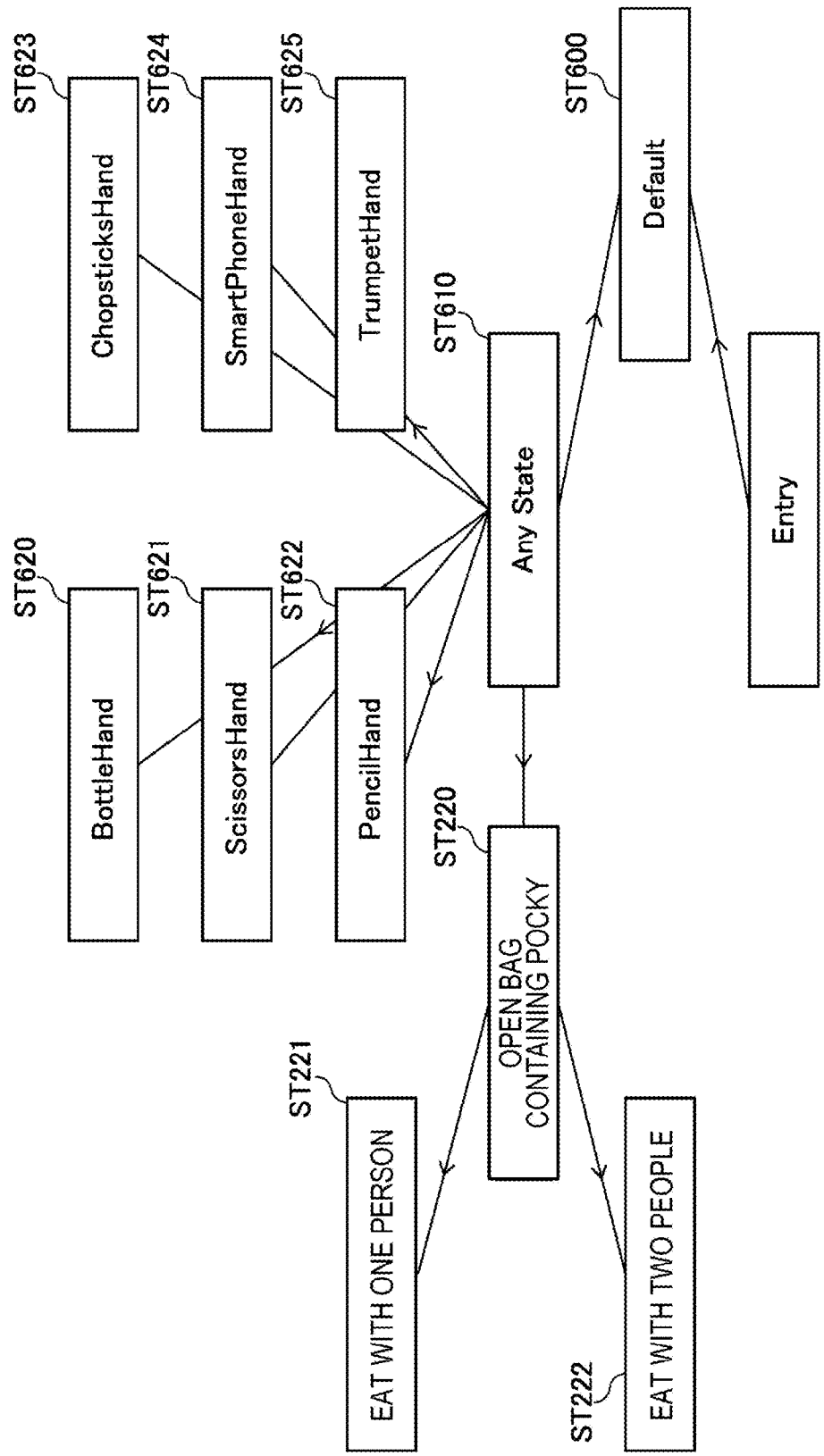
FIG. 22 is a view illustrating another example of a state machine suitably usable in an animation control section.

FIG. 22 is a view illustrating another example of a state machine suitably usable in the animation control section 157. The example shown in FIG. 22 differs from the state machine described with reference to FIG. 6 in that states ST220 to ST222 are added. In this case, for example, the state ST220 represents an exclusively used state for a predetermined object "Pocky (registered trademark)". In this case, for example, a movement to open a bag containing Pocky may be rendered as an animation. When an interference state is detected in the exclusively used state, the state ST220 transitions into any one of the state ST221 and the state ST222 according to the degree of intimacy between two user avatars M1 that establish the interference state. Specifically, when the degree of intimacy is lower than a threshold, the state ST220 transitions into the state ST221, and a movement of eating Pocky with one person (user avatar M1 with one person in an exclusively used state) may be rendered as an animation in an exclusively used state. When the degree of intimacy is higher than or equal to the threshold, the state ST220 transitions into the state ST222, and a movement of eating Pocky with two persons may be rendered as an animation in a shared state.

When a dependent object is a specific predetermined object, the prohibiting section 158 executes a predetermined process such that no interference state occurs. In other words, when a parent-child relationship in which a specific predetermined object is a dependent object of one user avatar M1 is established, the prohibiting section 158 executes a predetermined process such that no interference state (subsequent interference state) occurs while the parent-child relationship is maintained (for example, until the release condition is satisfied). The predetermined process includes sending feedback to the terminal apparatus 20 concerned with a user who operates a user avatar that is likely to establish an interference state. The terminal apparatus 20 may impart vibration, reaction force, or the like to the user in response to the feedback. When, for example, the user holds a haptics device as one element of the input section 24, vibration, reaction force, or the like may be imparted to the user via the haptics device such that the hand part M2 of an associated user avatar M1 does not approach the specific predetermined object any more.

In the example shown in FIGS. 7 to 22, the server apparatus 10 and the terminal apparatus 20 cooperate each other to implement various functions, and such assignment of functions can be changed as needed. In other words, one or some or all of various functions of the server apparatus 10 shown in FIG. 16 may be implemented by the terminal apparatus 20. Alternatively, one or some of various functions of the terminal apparatus 20 shown in FIG. 7 may be implemented by the server apparatus 10. For example, one or some or all of the positional relationship calculation section 150 and the interference detecting section 154 of the server apparatus 10 may be implemented by the terminal apparatus 20, and one or some or all of the avatar movement processing section 254 and the rendering section 258 of the terminal apparatus 20 may be implemented by the server apparatus 10.

Next, an example of the operation of the server apparatus 10 in relation to the adjustment method performed by the object management section 156 will be described with reference to FIGS. 23 to 26.

Figure 23:
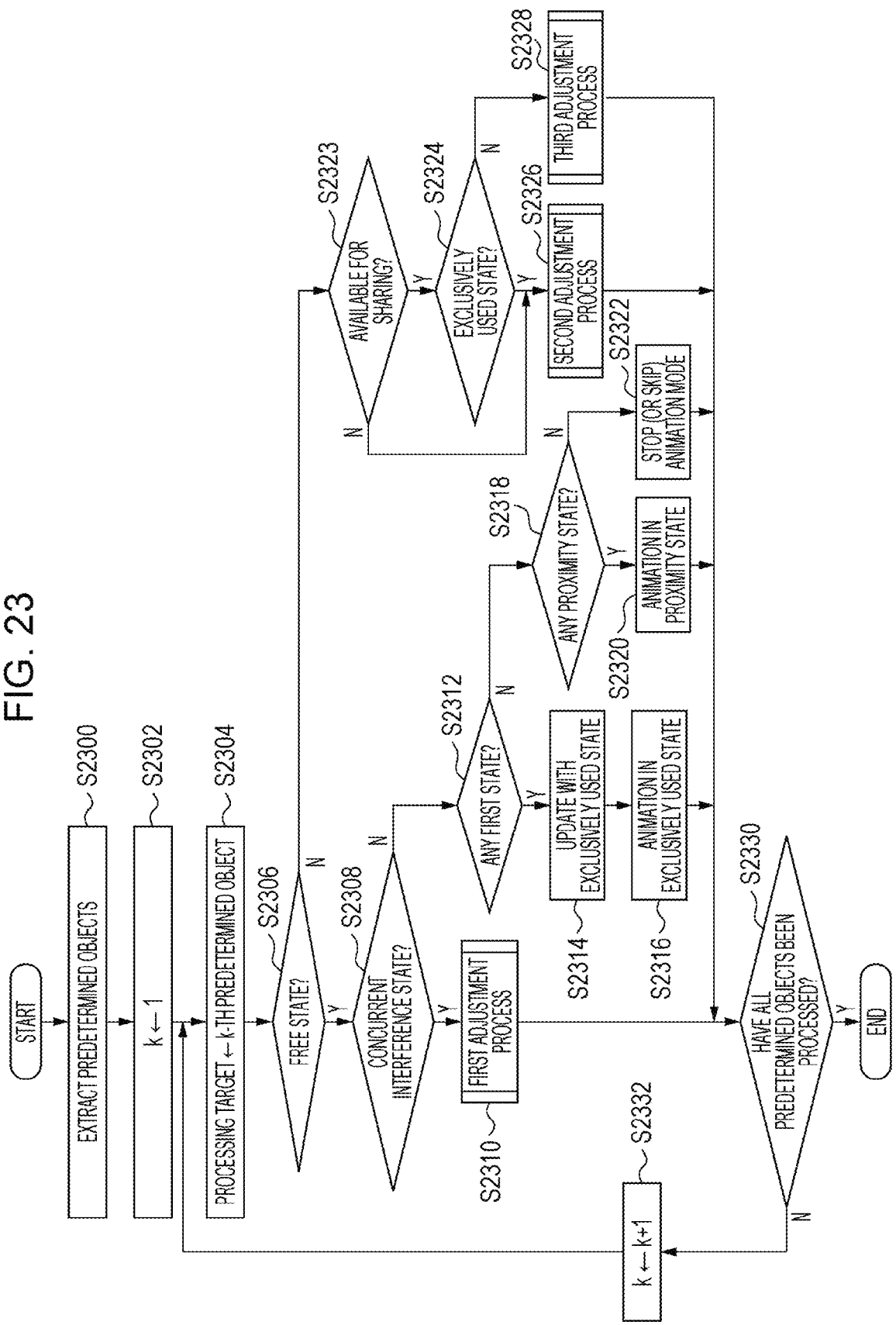
FIG. 23 is a flowchart showing an example of a process that is executed by the server apparatus in relation to an adjustment method that is executed by an object management section.

FIG. 23 is a flowchart showing an example of a process that is executed by the server apparatus 10 in relation to the adjustment method performed by the object management section 156. FIG. 23 may be repeatedly executed at predetermined intervals.

In step S2300, the server apparatus 10 extracts predetermined objects to be monitored. Predetermined objects to be monitored may be predetermined objects rendered in a terminal image to be displayed on any terminal apparatus 20. In another embodiment, all the predetermined objects may be objects to be monitored. In a situation in which a plurality of user avatars M1 is placed in a virtual space, the same predetermined object can be rendered in two or more terminal apparatuses 20 at the same time.

In step S2302, the server apparatus 10 sorts the one or more predetermined objects extracted in step S2300 in predetermined order and sets a variable k to "1".

In step S2304, the server apparatus 10 sets the k-th predetermined object as an object to be processed.

In step S2306, the server apparatus 10 determines whether the setting information of the parent-child relationship concerned with the k-th predetermined object indicates a free state in accordance with the object information 1800 (see FIG. 18) concerned with the k-th predetermined object. When the determination result is "YES", the process proceeds to step S2308; otherwise (when the setting information of the parent-child relationship indicates an exclusively used state or a shared state), the process proceeds to step S2323.

In step S2308, the server apparatus 10 determines whether the concurrent interference state has been detected for the k-th predetermined object. The concurrent interference state is as described above in relation to the interference detecting section 154. When the determination result is "YES", the process proceeds to step S2310; otherwise, the process proceeds to step S2312.

In step S2310, the server apparatus 10 executes an adjustment process on the concurrent interference state concerned with the predetermined object in a free state (hereinafter, also referred to as "first adjustment process"). The first adjustment process will be described later with reference to FIG. 24.

In step S2312, the server apparatus 10 determines whether the distance (object-to-object distance) between any one user avatar M1 and the k-th predetermined object is shorter than or equal to the first predetermined distance d1 in accordance with the positional relationship information 1900 (see FIG. 19). In other words, the server apparatus 10 determines whether there is a transition from the second state to the first state in relation to the positional relationship information concerned with the k-th predetermined object for any one user avatar M1. When the determination result is "YES", the process proceeds to step S2314; otherwise, the process proceeds to step S2318.

In step S2314, the server apparatus 10 updates the setting information of the parent-child relationship concerned with the k-th predetermined object from information indicating a free state to information indicating an exclusively used state of being a dependent object of the one user avatar M1. In this case, the one user avatar M1 is a user avatar M1 concerned with the positional relationship information transitioned from the second state to the first state of the positional relationship information concerned with the k-th predetermined object (positional relationship information for each user avatar M1) and is also simply referred to as "user avatar M1 that has established the exclusively used state of the k-th predetermined object".

In step S2316, the server apparatus 10 transmits a rendering command including a data ID concerned with associated first animation data to the associated terminal apparatus 20 in order to render an animation concerned with a combination of the k-th predetermined object with the user avatar M1 that has established the exclusively used state of the k-th predetermined object (in FIG. 23, indicated by "animation in the exclusively used state"). In this case, the associated terminal apparatus 20 is the terminal apparatus 20 that is rendering a terminal image including the k-th predetermined object. In this case, the associated terminal apparatus 20 renders an animation in accordance with the first animation data associated with the data ID included in the rendering command.

In step S2316, when a predetermined condition (see the animation control information 2000 in FIG. 20) of the rendering condition at the time when the parent-child relationship is established for the k-th predetermined object is set, a data ID according to the predetermined condition may be selected.

In step S2318, the server apparatus 10 determines whether the distance (object-to-object distance) between any one user avatar M1 and the k-th predetermined object is shorter than or equal to the second predetermined distance d2 in accordance with the positional relationship information 1900 (see FIG. 19). In other words, the server apparatus 10 determines whether there is a transition from a non-proximity state to a proximity state in relation to the positional relationship information concerned with the k-th predetermined object for any one user avatar M1. When the determination result is "YES", the process proceeds to step S2320; otherwise, the process proceeds to step S2322.

In step S2320, the server apparatus 10 transmits a rendering command including a data ID concerned with associated second animation data to the associated terminal apparatus 20 in order to render an animation concerned with a combination of the k-th predetermined object with the user avatar M1 that has transitioned to the proximity state (in FIG. 23, indicated by "animation in the proximity state"). In this case, the associated terminal apparatus 20 renders an animation in accordance with the second animation data associated with the data ID included in the rendering command.

In step S2322, the server apparatus 10 transmits an animation stop command to the terminal apparatus 20 rendering an animation for the k-th predetermined object. In this case, the associated terminal apparatus 20 stops the animation mode and renders various objects (including the user avatar M1) in the normal mode. When there is no terminal apparatus 20 rendering an animation for the k-th predetermined object, the process skips step S2322.

In step S2323, the server apparatus 10 determines whether information on availability of sharing, associated with the k-th predetermined object, is "available for sharing" in accordance with the object information 1800 (see FIG. 18) in the predetermined object storage section 142. When the determination result is "YES", the process proceeds to step S2324; otherwise, the setting information of the parent-child relationship indicates an exclusively used state, and the process proceeds to step S2326.

In step S2324, the server apparatus 10 determines whether the setting information of the parent-child relationship concerned with the k-th predetermined object indicates an exclusively used state in accordance with the object information 1800 (see FIG. 18) concerned with the k-th predetermined object. When the determination result is "YES", the process proceeds to step S2326; otherwise (when the setting information of the parent-child relationship indicates a shared state), the process proceeds to step S2328.

In step S2326, the server apparatus 10 executes an adjustment process on the predetermined object in the exclusively used state by one user avatar M1 (hereinafter, also referred to as "second adjustment process"). The second adjustment process will be described later with reference to FIG. 25.

In step S2328, the server apparatus 10 executes an adjustment process on the predetermined object in a shared state by two or more user avatars M1 (hereinafter, also referred to as "third adjustment process"). The third adjustment process will be described later with reference to FIG. 26.

In step S2330, the server apparatus 10 determines whether all the one or more predetermined objects extracted in step S2300 have been processed. When the determination result is "YES", the process in the current cycle ends; otherwise, the process from step S2304 is repeated via step S2332.

In step S2332, the server apparatus 10 increments the variable k by "1".

Figure 24:
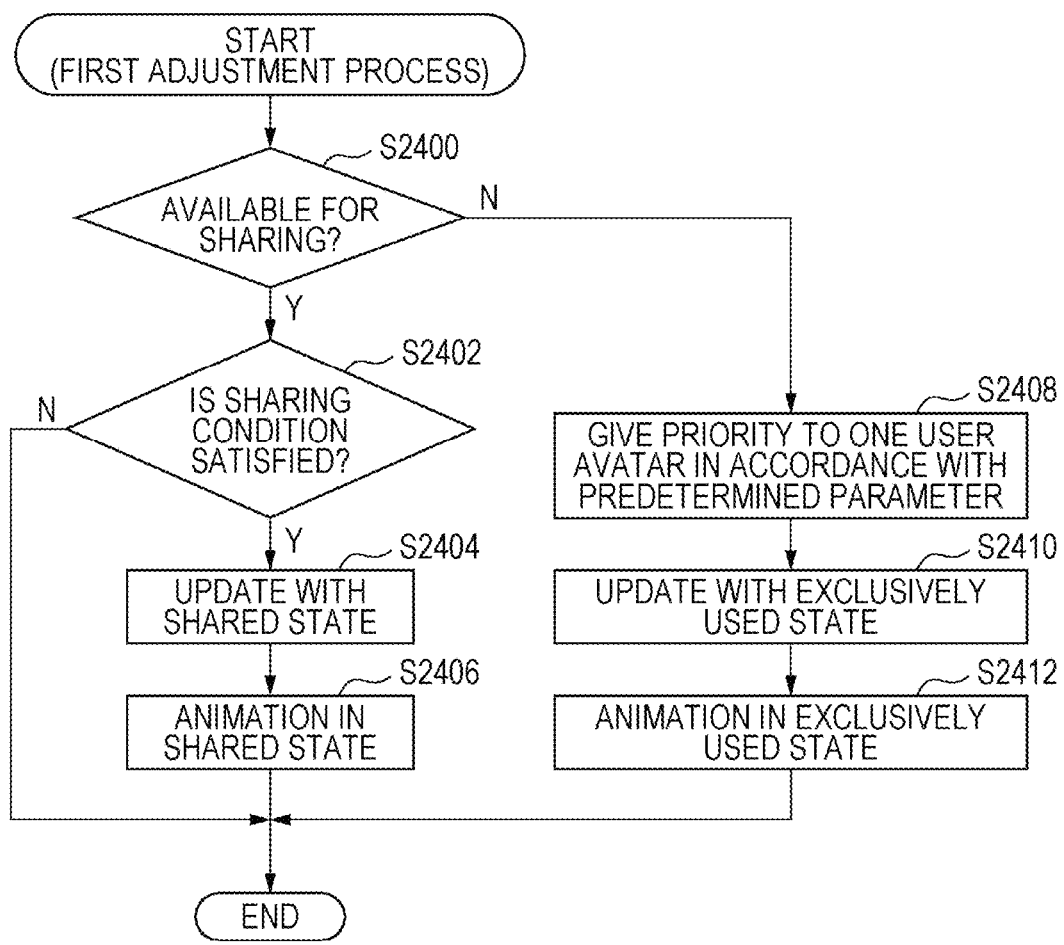
FIG. 24 is a schematic flowchart showing an example of an adjustment process (step S2310 in FIG. 23) for a concurrent interference state of a predetermined object in a free state.

FIG. 24 is a schematic flowchart showing an example of the first adjustment process (step S2310 in FIG. 23) that is an adjustment process for a concurrent interference state concerned with a predetermined object in a free state.

In step S2400, the server apparatus 10 determines whether information on availability of sharing, associated with the k-th predetermined object, is "available for sharing" in accordance with the object information 1800 (see FIG. 18) in the predetermined object storage section 142. When the determination result is "YES", the process proceeds to step S2402; otherwise, the process proceeds to step S2408.

In step S2402, the server apparatus 10 determines whether the sharing condition is satisfied in accordance with information on a sharing condition associated with the k-th predetermined object (see the object information 1800 in FIG. 18). The sharing condition may be as described above with reference to FIG. 18. When the determination result is "YES", the process proceeds to step S2404; otherwise, the process in the current cycle ends. In other words, when the sharing condition is not satisfied, the k-th predetermined object remains in a free state. However, when the sharing condition is not satisfied, the process may proceed to step S2408.

In step S2404, the server apparatus 10 updates the setting information of the parent-child relationship concerned with the k-th predetermined object from information indicating a free state to information indicating a shared state of being a dependent object of the two or more user avatars M1 having established the concurrent interference state.

In the object information 1800 (see FIG. 18) concerned with the k-th predetermined object, when the information on availability of sharing defines the number of user avatars M1 available for sharing and the number of two or more user avatars M1 that have established the concurrent interference state exceeds the maximum number, the server apparatus 10 may determine the maximum number of user avatars M1 of which the dependent object is the k-th predetermined object, in accordance with the values of the predetermined parameters of the two or more user avatars M1. In this case, when, for example, a power parameter is used, user avatars M1 up to the maximum number in descending order of the value of power parameter may be selected as the "parents" of the k-th predetermined object as described above. In this case, the server apparatus 10 updates the setting information of the parent-child relationship concerned with the k-th predetermined object from information indicating a free state to information indicating a shared state of being a dependent object of the maximum number of user avatars M1, determined as described above, of the two or more user avatars M1 that have established the concurrent interference state.

In step S2406, the server apparatus 10 transmits a rendering command including a data ID concerned with associated first animation data to the associated terminal apparatus 20 in order to render an animation concerned with a combination of the k-th predetermined object with the two or more user avatars M1 that have established the shared state of the k-th predetermined object (in FIG. 24, indicated by "animation in the shared state"). In this case, the associated terminal apparatus 20 renders an animation in accordance with the first animation data associated with the data ID included in the rendering command.

The following are practical examples in which the sharing condition at S2402 and the animation in a shared state of S2406 are satisfied:

(1) When a user avatar approaches a chair and the distance between the user avatar and the chair falls below a predetermined distance (sharing condition), an animation of the avatar sitting on the chair is drawn and played. Two or more avatars may be applied, and two or more avatars may sit in one or more chairs together.

(2) When a user avatar approaches a transportation object (e.g. car, horse, elephant, etc.) and the distance between the user avatar and the transportation object falls below a predetermined distance (sharing condition), the avatar rides the transportation object and an animation of the transportation object moving forward is drawn and played. Two or more avatars may be applied, and two or more avatars may sit on the transportation object together.

(3) When a user avatar approaches a pit (hole, sudden lower elevation, etc.) and the distance between the user avatar and the pit falls below a predetermined distance (sharing condition), an animation of the avatar falling into the pit is drawn and played.

(4) When a user avatar approaches a musical instrument (e.g. a guitar) and the distance between the user avatar and the musical instrument falls below a predetermined distance (sharing condition), an animation of the avatar playing the musical instrument is drawn and played.

In step S2408, the server apparatus 10 determines one user avatar M1 of which the dependent object is the k-th predetermined object from among two or more user avatars M1 that have established the concurrent interference state, in accordance with the values of the predetermined parameters of the two or more user avatars M1 that have established the concurrent interference state. In this case, when, for example, a power parameter is used, the user avatar M1 with the largest value of power parameter may be selected as the one user avatar M1 of which the dependent object is the k-th predetermined object as described above.

In step S2410, the server apparatus 10 updates the setting information of the parent-child relationship concerned with the k-th predetermined object from information indicating a free state to information indicating an exclusively used state of being a dependent object of the one user avatar M1 determined in step S2408.

In step S2412, the server apparatus 10 transmits a rendering command including a data ID concerned with associated first animation data to the associated terminal apparatus 20 in order to render an animation concerned with a combination of the k-th predetermined object with the one user avatar M1 determined in step S2408 (in FIG. 24, indicated by "animation in the exclusively used state"). In this case, the associated terminal apparatus 20 renders an animation in accordance with the first animation data associated with the data ID included in the rendering command.

Figure 25:
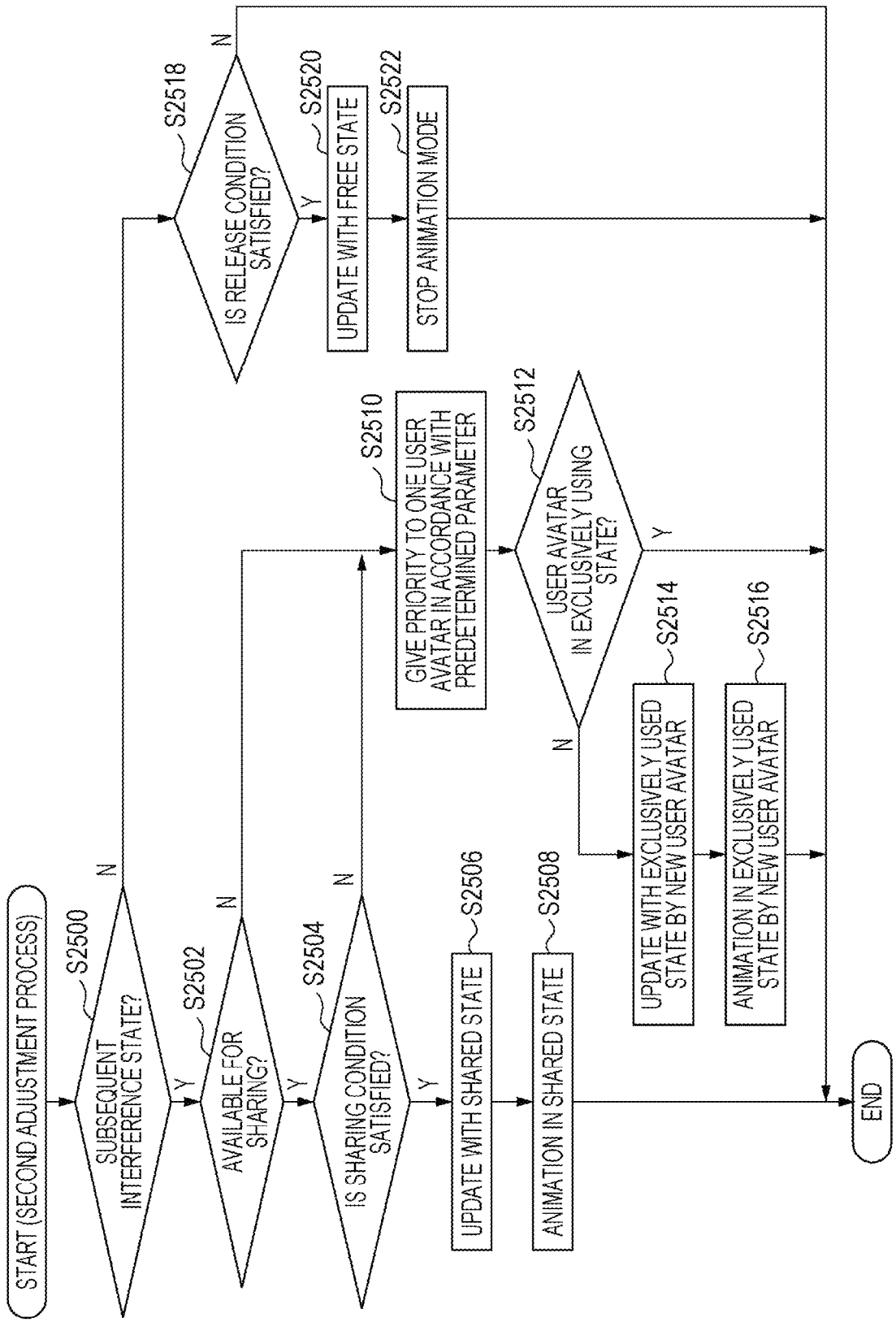
FIG. 25 is a schematic flowchart showing an example of an adjustment process (step S2326 in FIG. 23) for a predetermined object in an exclusively used state by one user avatar.

FIG. 25 is a schematic flowchart showing an example of the second adjustment process (step S2326 in FIG. 23) that is an adjustment process for a predetermined object in an exclusively used state by one user avatar M1. Hereinafter, before the start of the adjustment process, one user avatar M1 of which the dependent object is the k-th predetermined object is also referred to as "user avatar M1 in an exclusively using state".

In step S2500, the server apparatus 10 determines whether the subsequent interference state has been detected for the k-th predetermined object. The subsequent interference state is as described above in relation to the interference detecting section 154. When the determination result is "YES", the process proceeds to step S2502; otherwise, the process proceeds to step S2518.

In step S2502, the server apparatus 10 determines whether information on availability of sharing, associated with the k-th predetermined object, is "available for sharing" in accordance with the object information 1800 (see FIG. 18) in the predetermined object storage section 142. When the determination result is "YES", the process proceeds to step S2504; otherwise, the process proceeds to step S2510.

In step S2504, the server apparatus 10 determines whether the sharing condition is satisfied in accordance with information on a sharing condition associated with the k-th predetermined object (see the object information 1800 in FIG. 18). The sharing condition may be as described above with reference to FIG. 18. When the determination result is "YES", the process proceeds to step S2506; otherwise, the process proceeds to step S2510. When the determination result is "YES", the predetermined cancellation condition is satisfied. In other words, in this case, the predetermined cancellation condition is satisfied in accordance with a factor (an example of a first factor) that the interference state has been detected and the sharing condition is satisfied. The sharing condition may be satisfied when, for example, the degree of intimacy between two or more user avatars M1 that have established the subsequent interference state is higher than or equal to a threshold, as described above.

In step S2506, the server apparatus 10 updates the setting information of the parent-child relationship concerned with the k-th predetermined object from information indicating an exclusively used state to information indicating a shared state of being a dependent object of the two or more user avatars M1 that have established the subsequent interference state.

In the object information 1800 (see FIG. 18) concerned with the k-th predetermined object, when the information on availability of sharing defines the number of user avatars M1 available for sharing and the number of two or more user avatars M1 that have established the subsequent interference state exceeds the maximum number, the server apparatus 10 may determine the maximum number of user avatars M1 of which the dependent object is the k-th predetermined object, in accordance with the values of the predetermined parameters of the two or more user avatars M1. In this case, when, for example, a power parameter is used, user avatars M1 up to the maximum number in descending order of the value of power parameter may be selected as the "parents" of the k-th predetermined object as described above. In this case, the server apparatus 10 updates the setting information of the parent-child relationship concerned with the k-th predetermined object from information indicating an exclusively used state to information indicating a shared state of being a dependent object of the maximum number of user avatars M1, determined as described above, of the two or more user avatars M1 that have established the subsequent interference state.

In step S2508, the server apparatus 10 transmits a rendering command including a data ID concerned with associated first animation data to the associated terminal apparatus 20 in order to render an animation concerned with a combination of the k-th predetermined object with the two or more user avatars M1 that have established the shared state of the k-th predetermined object (in FIG. 25, indicated by "animation in the shared state"). In this case, the associated terminal apparatus 20 renders an animation in accordance with the first animation data associated with the data ID included in the rendering command.

The following are practical examples in which the sharing condition at S2504 and the animation in a shared state of S2508 are satisfied:

(1) When a user avatar approaches a chair and the distance between the user avatar and the chair falls below a predetermined distance (sharing condition), an animation of the avatar sitting on the chair is drawn and played. Two or more avatars may be applied, and two or more avatars may sit in one or more chairs together.

(2) When a user avatar approaches a transportation object (e.g. car, horse, elephant, etc.) and the distance between the user avatar and the transportation object falls below a predetermined distance (sharing condition), the avatar rides the transportation object and an animation of the transportation object moving forward is drawn and played. Two or more avatars may be applied, and two or more avatars may sit on the transportation object together.

(3) When a user avatar approaches a pit (hole, sudden lower elevation, etc.) and the distance between the user avatar and the pit falls below a predetermined distance (sharing condition), an animation of the avatar falling into the pit is drawn and played.

(4) When a user avatar approaches a musical instrument (e.g. a guitar) and the distance between the user avatar and the musical instrument falls below a predetermined distance (sharing condition), an animation of the avatar playing the musical instrument is drawn and played.

In step S2510, the server apparatus 10 determines one user avatar M1 of which the dependent object is the k-th predetermined object from among two or more user avatars M1 that have established the subsequent interference state, in accordance with the values of the predetermined parameters of the two or more user avatars M1 that have established the subsequent interference state. In this case, when, for example, a priority parameter is used, the user avatar M1 with the highest value of priority parameter may be selected as the one user avatar M1 of which the dependent object is the k-th predetermined object as described above. This also applies to the case where a power parameter is used.

In step S2512, the server apparatus 10 determines whether the user avatar M1 determined in step S2510 is a user avatars M1 in an exclusively using state. When the determination result is "YES", the process in the current cycle ends without changing the setting information of the parent-child relationship concerned with the k-th predetermined object (in this case, the animation rendering process in the associated terminal apparatus 20 is continued). When the determination result is "NO", the predetermined cancellation condition is satisfied, and the process proceeds to step S2514. In other words, when the determination result is "NO", the predetermined cancellation condition is satisfied in accordance with a factor (an example of a second factor) in which the interference state has been detected and another one user avatar (one user avatar M1 that has established the first state later for the k-th predetermined object) is greater in power or higher in priority than the user avatar M1 in the exclusively using state.

In step S2514, the server apparatus 10 updates the setting information of the parent-child relationship concerned with the k-th predetermined object from information indicating an exclusively used state by the user avatar M1 in the exclusively using state to information indicating an exclusively used state of being a dependent object of the one user avatar M1 determined in step S2510.

In step S2516, the server apparatus 10 transmits a rendering command including a data ID concerned with associated first animation data to the associated terminal apparatus 20 in order to render an animation concerned with a combination of the k-th predetermined object with the one user avatar M1 determined in step S2510 (in FIG. 25, indicated by "animation in the exclusively used state"). In this case, the associated terminal apparatus 20 renders an animation in accordance with the first animation data associated with the data ID included in the rendering command.

In step S2518, the server apparatus 10 determines whether the release condition (see the object information 1800 in FIG. 18) concerned with the k-th predetermined object is satisfied. When the release condition concerned with an exclusively used state and the release condition concerned with a shared state are associated with the k-th predetermined object (see, for example, predetermined object ID "B01" in FIG. 18), the release condition concerned with the exclusively used state is used. When the determination result is "YES", the predetermined cancellation condition is satisfied, and the process proceeds to step S2520; otherwise, the process in the current cycle ends (in this case, the animation rendering process in the associated terminal apparatus 20 is continued).

In step S2520, the server apparatus 10 updates the setting information of the parent-child relationship concerned with the k-th predetermined object from information indicating an exclusively used state to information indicating a free state.

In step S2522, the server apparatus 10 transmits an animation stop command to the terminal apparatus 20 rendering an animation for the k-th predetermined object. In this case, the associated terminal apparatus 20 stops the animation mode and renders various objects (including the user avatar M1) in the normal mode.

Figure 26:
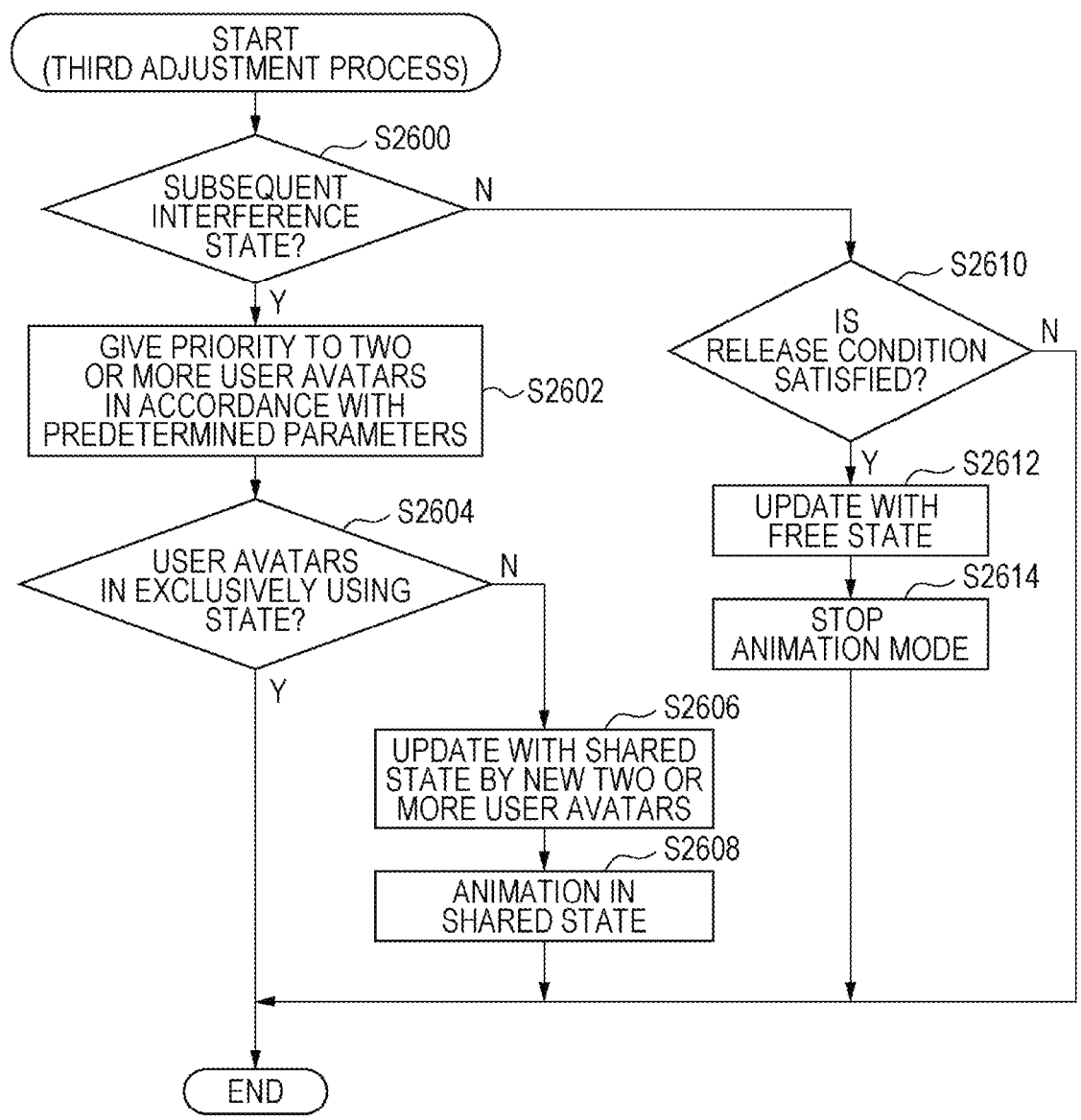
FIG. 26 is a schematic flowchart showing an example of an adjustment process (step S2328 in FIG. 23) for a predetermined object in a shared state by two or more user avatars.

FIG. 26 is a schematic flowchart showing an example of the third adjustment process (step S2328 in FIG. 23) that is an adjustment process for a predetermined object in a shared state by two or more user avatars M1. Hereinafter, before the start of the adjustment process, two or more user avatars M1 of which the dependent object is the k-th predetermined object are also referred to as "two or more user avatars M1 in an exclusively using state".

In step S2600, the server apparatus 10 determines whether the subsequent interference state has been detected for the k-th predetermined object. The subsequent interference state is as described above in relation to the interference detecting section 154. When the determination result is "YES", the process proceeds to step S2602; otherwise, the process proceeds to step S2610.

In step S2602, the server apparatus 10 determines two or more user avatars M1 of which the dependent object is the k-th predetermined object in a mode in which the sharing condition is satisfied, in accordance with the values of the predetermined parameters of the two or more user avatars M1 that have established the subsequent interference state. In the object information 1800 (see FIG. 18) concerned with the k-th predetermined object, when the information on availability of sharing defines the number of user avatars M1 available for sharing and the number of two or more user avatars M1 that have established the subsequent interference state exceeds the maximum number, the server apparatus 10 may determine the maximum number of user avatars M1 of which the dependent object is the k-th predetermined object, in accordance with the values of the predetermined parameters of the two or more user avatars M1. In this case, when, for example, a power parameter is used, user avatars M1 up to the maximum number in descending order of the value of power parameter may be selected as the "parents" of the k-th predetermined object as described above.

In step S2604, the server apparatus 10 determines whether the two or more user avatars M1 determined in step S2602 are two or more user avatars M1 in an exclusively using state. When the determination result is "YES", the process in the current cycle ends without changing the setting information of the parent-child relationship concerned with the k-th predetermined object (in this case, the animation rendering process in the associated terminal apparatus 20 is continued). When the determination result is "NO", the predetermined cancellation condition is satisfied, and the process proceeds to step S2606.

In step S2606, the server apparatus 10 updates the setting information of the parent-child relationship concerned with the k-th predetermined object from information indicating a shared state by the two or more user avatars M1 in an exclusively using state to information indicating a shared state of being a dependent object of the two or more user avatars M1 determined as described above.

In step S2608, the server apparatus 10 transmits a rendering command including a data ID concerned with associated first animation data to the associated terminal apparatus 20 in order to render an animation concerned with a combination of the k-th predetermined object with the two or more user avatars M1 that have established the shared state of the k-th predetermined object (in FIG. 26, indicated by "animation in the shared state"). In this case, the associated terminal apparatus 20 renders an animation in accordance with the first animation data associated with the data ID included in the rendering command.

In step S2610, the server apparatus 10 determines whether the release condition (see the object information 1800 in FIG. 18) concerned with the k-th predetermined object is satisfied. When the release condition concerned with an exclusively used state and the release condition concerned with a shared state are associated with the k-th predetermined object, the release condition concerned with the shared state is used (see, for example, predetermined object ID "B01" in FIG. 18). The release condition associated with the shared state may include the release condition of each of the user avatars M1 that establish the shared state and the overall release condition. When the determination result is "YES", the predetermined cancellation condition is satisfied, and the process proceeds to step S2612; otherwise, the process in the current cycle ends (in this case, the animation rendering process in the associated terminal apparatus 20 is continued).

In step S2612, the server apparatus 10 updates the setting information of the parent-child relationship concerned with the k-th predetermined object from information indicating a shared state to information indicating a free state.

In step S2614, the server apparatus 10 transmits an animation stop command to the terminal apparatus 20 rendering an animation for the k-th predetermined object. In this case, the associated terminal apparatus 20 stops the animation mode and renders various objects (including the user avatar M1) in the normal mode.

In the example shown in FIG. 26, when the release condition of one or some of the two or more user avatars M1 that establish a shared state is satisfied in step S2612, the server apparatus 10 may update the setting information of the parent-child relationship concerned with the k-th predetermined object from information indicating a shared state by two or more user avatars M1 in an exclusively using state to information indicating an exclusively used state or a shared state by other two or more user avatars M1. In this case, in the subsequent step S2614, the server apparatus 10 may transmit a rendering command including a data ID concerned with associated first animation data to the associated terminal apparatus 20.

In the example shown in FIGS. 23 to 26, the operations of the prohibiting section 158 and the like described with reference to FIG. 16, and the prohibiting section 158 and the like may be incorporated as needed.

The embodiment has been described in detail with reference to the accompanying drawings; however, a specific configuration is not limited to the above-described embodiment and also encompasses the design and the like without departing from the scope of the invention.

For example, in the above-described embodiment, an animation relates to only the hand part M2, of the parts of the user avatar M1; however, the configuration is not limited thereto. An animation may be prepared for a combination of a hand part M2 with an arm part (a part from an elbow or a part from a shoulder) may be prepared. Alternatively, when an animation relates to an eating movement or the like of the user avatar M1, an animation of part (for example, mouth part) of a face part may be included.

Figure 27:
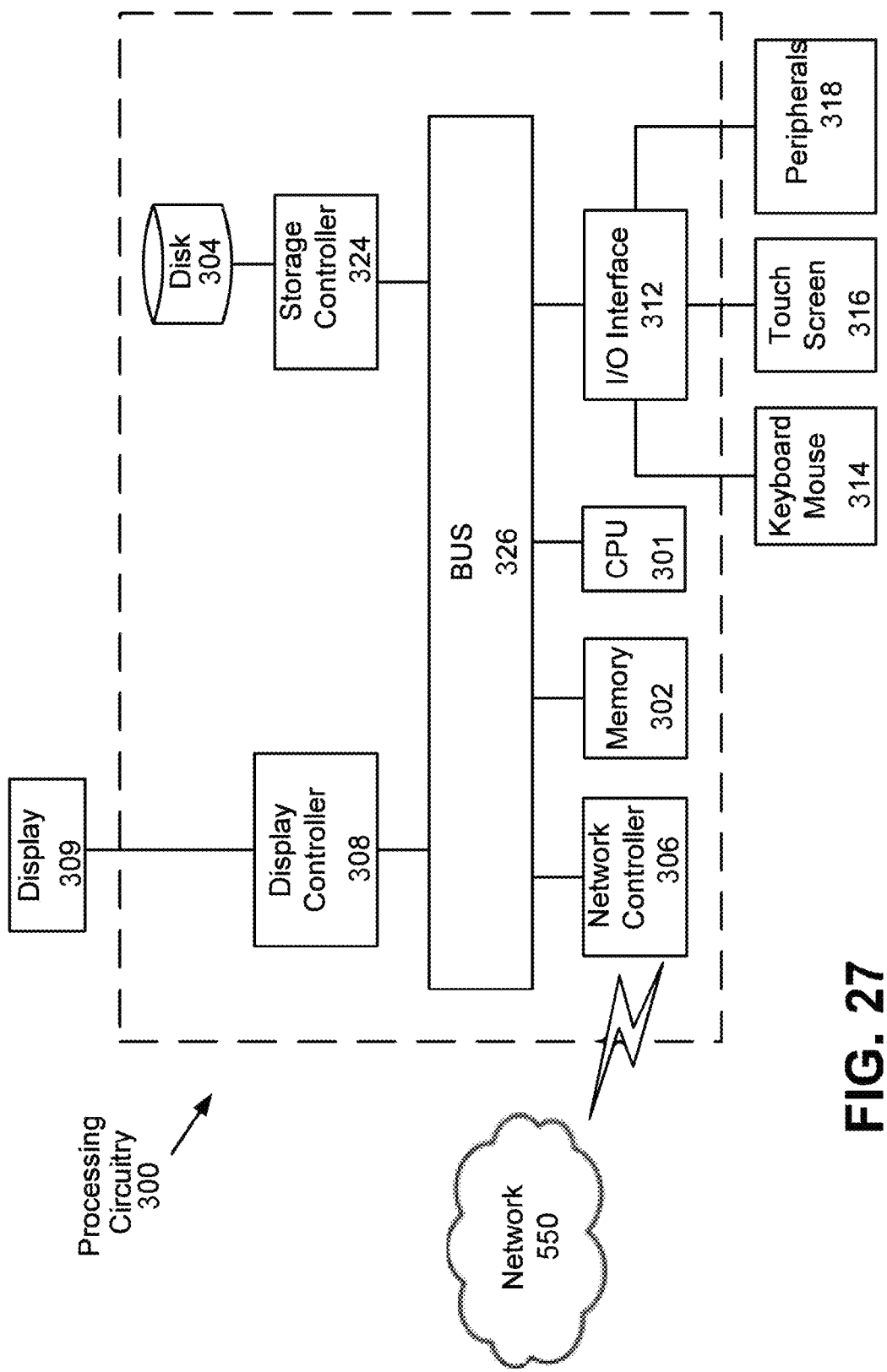
FIG. 27 is a block diagram of processing circuitry that performs computer-based operations in accordance with the present disclosure.

FIG. 27 is a block diagram of processing circuitry that performs computer-based operations in accordance with the present disclosure. FIG. 27 illustrates processing circuitry 300 of server apparatus 10 and/or terminal apparatus 20.

Processing circuitry 300 is used to control any computer-based and cloud-based control processes, descriptions or blocks in flowcharts can be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art. The functionality of the elements disclosed herein may be implemented using circuitry or processing circuitry which may include general purpose processors, special purpose processors, integrated circuits, ASICs ("Application Specific Integrated Circuits"), conventional circuitry and/or combinations thereof which are configured or programmed to perform the disclosed functionality. Processors are processing circuitry or circuitry as they include transistors and other circuitry therein. The processor may be a programmed processor which executes a program stored in a memory. In the disclosure, the processing circuitry, units, or means are hardware that carry out or are programmed to perform the recited functionality. The hardware may be any hardware disclosed herein or otherwise known which is programmed or configured to carry out the recited functionality.

In FIG. 27, the processing circuitry 300 includes a CPU 301 which performs one or more of the control processes discussed in this disclosure. The process data and instructions may be stored in memory 302. These processes and instructions may also be stored on a storage medium disk 304 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other non-transitory computer readable medium of an information processing device with which the processing circuitry 300 communicates, such as a server or computer. The processes may also be stored in network based storage, cloud-based storage or other mobile accessible storage and executable by processing circuitry 300.

Further, the claimed advancements may be provided as a utility application, background daemon, or component of an operating system, or combination thereof, executing in conjunction with CPU 301 and an operating system such as Microsoft Windows, UNIX, Solaris, LINUX, Apple MAC-OS, Apple iOS and other systems known to those skilled in the art.

The hardware elements in order to achieve the processing circuitry 300 may be realized by various circuitry elements. Further, each of the functions of the above described embodiments may be implemented by circuitry, which includes one or more processing circuits. A processing circuit includes a particularly programmed processor, for example, processor (CPU) 301, as shown in FIG. 27. A processing circuit also includes devices such as an application specific integrated circuit (ASIC) and conventional circuit components arranged to perform the recited functions.

In FIG. 27, the processing circuitry 300 may be a computer or a particular, special-purpose machine. Processing circuitry 300 is programmed to execute processing to control server apparatus 10 and/or terminal apparatus 20.

Alternatively, or additionally, the CPU 301 may be implemented on an FPGA, ASIC, PLD or using discrete logic circuits, as one of ordinary skill in the art would recognize. Further, CPU 301 may be implemented as multiple processors cooperatively working in parallel to perform the instructions of the inventive processes described above.

The processing circuitry 300 in FIG. 27 also includes a network controller 306, such as an Ethernet PRO network interface card, for interfacing with network 550. As can be appreciated, the network 550 can be a public network, such as the Internet, or a private network such as a local area network (LAN) or wide area network (WAN), or any combination thereof and can also include Public Switched Telephone Network (PSTN) or Integrated Services Digital Network (ISDN) sub-networks. The network 550 can also be wired, such as an Ethernet network, universal serial bus (USB) cable, or can be wireless such as a cellular network including EDGE, 3G and 4G wireless cellular systems. The wireless network can also be Wi-Fi, wireless LAN, Bluetooth, or any other wireless form of communication that is known. Additionally, network controller 306 may be compliant with other direct communication standards, such as Bluetooth, a near field communication (NFC), infrared ray or other.

The processing circuitry 300 further includes a display controller 308, such as a graphics card or graphics adaptor for interfacing with display 309, such as a monitor. An I/O interface 312 interfaces with a keyboard and/or mouse 314 as well as a touch screen panel 316 on or separate from display 309. I/O interface 312 also connects to a variety of peripherals 318.

The storage controller 324 connects the storage medium disk 304 with communication bus 326, which may be an ISA, EISA, VESA, PCI, or similar, for interconnecting all of the components of the processing circuitry 300. A description of the general features and functionality of the display 309, keyboard and/or mouse 314, as well as the display controller 308, storage controller 324, network controller 306, and I/O interface 312 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

What is claimed is:

1. An information processing system, comprising:
a memory that stores object information relating to plural objects within a virtual space; and
processing circuitry configured to
generate a display image by rendering the plural objects in the virtual space in accordance with the object information;
acquire a user input of a user, wherein the user input relates to a user object of the plural objects, the user object being associated with the user, and the user object including a first part and a second part coupled to the first part;
determine a movement of the first part of the user object in the virtual space in accordance with the user input;
generate positional relationship information in accordance with the movement of the user object, the positional relationship information indicating a positional relationship in the virtual space between the first part and a predetermined object of the plural objects;
store first rendering information for rendering a first animation with a combination of the first and second parts of the user object and the predetermined object; and
generate the first animation in accordance with the first rendering information in a case that a distance between the predetermined object and the first part is shorter than or equal to a predetermined distance according to the positional relationship information, wherein
the first animation includes animation corresponding to the movement of the first part of the user object and animation corresponding to movement of the second part of the user object.

2. The information processing system according to claim 1, wherein the user input includes information on joints in an area corresponding to the second part in the user or information on a movement in the area.

3. The information processing system according to claim 2, wherein the processing circuitry generates the positional relationship information in accordance with position information of the joints in the area corresponding to the second part.

4. The information processing system according to claim 1, wherein
the user input includes information on joints of an area corresponding to the first part in the associated user or movement information of the area, and
to generate the first animation, the processing circuitry is further configured to:
render the first part in accordance with information on the joints of the area corresponding to the first part or movement information of the area in a case that a distance between the predetermined object and the first part is longer than a predetermined distance, and
render the first part not in accordance with information on the joints of the area corresponding to the first part or movement information of the area in a case that the distance between the predetermined object and the first part is shorter than or equal to the predetermined distance.

5. The information processing system according to claim 1, wherein
the positional relationship information indicates a positional relationship of any one of a plurality of states including a first state where the distance is shorter than or equal to the predetermined distance and a second state where the distance is longer than the predetermined distance, and
the processing circuitry renders the first animation in accordance with a transition from the second state to the first state.

6. The information processing system according to claim 5, wherein the processing circuitry is further configured to
manage a master-slave relationship of the plural objects, and
update the master-slave relationship of the predetermined object with a first relationship in which the predetermined object becomes a dependent object of the user object in accordance with a transition from the second state to the first state in the positional relationship between the user object and the predetermined object.

7. The information processing system according to claim 6, wherein, in a case that the processing circuitry updates the master-slave relationship of the predetermined object with the first relationship, the processing circuitry maintains the updated master-slave relationship until a predetermined cancellation condition is satisfied.

8. The information processing system according to claim 7, wherein the processing circuitry renders the first animation with a combination of the user object with the predetermined object that is the dependent object of the user object in accordance with the master-slave relationship until the predetermined cancellation condition is satisfied.

9. The information processing system according to claim 7, wherein the predetermined cancellation condition is satisfied in accordance with at least any one of a lapse of a predetermined time, a transition from the first state to the second state, and a cancellation input included in the user input.

10. The information processing system according to claim 7, wherein the processing circuitry is further configured to
detect an interference state in a case that the positional relationship of another user object with respect to the predetermined object, which is the dependent object of the user object, transitions from the second state to the first state, or in a case that the positional relationship of the user object with respect to the predetermined object and the positional relationship of the another user object with respect to the predetermined object simultaneously transition from the second state to the first state, and
adjust the master-slave relationship of the predetermined object in accordance with a result detected by the processing circuitry.

11. The information processing system according to claim 10, wherein the processing circuitry adjusts the master-slave relationship of the predetermined object in accordance with a value of a predetermined parameter indicating a relationship between the user object and the another user object.

12. The information processing system according to claim 11, wherein
the predetermined parameter includes a parameter indicating a degree of intimacy,
the predetermined cancellation condition is satisfied in accordance with a first factor including that the interference state is detected and that a degree of intimacy between the user object and the another user object is higher than or equal to a threshold, and
the processing circuitry updates the master-slave relationship of the predetermined object with a second relationship in which the predetermined object becomes a dependent object of both the user object and the another user object in a case that the predetermined cancellation condition is satisfied in accordance with the first factor.

13. The information processing system according to claim 12, wherein in a case that the master-slave relationship of the predetermined object is updated with the second relationship, the processing circuitry renders the first animation concerned with a combination of the user object, the another user object, and the predetermined object that is the dependent object of the user object and the another user object.

14. The information processing system according to claim 11, wherein
the predetermined parameter includes a parameter indicating a power relationship or a priority relationship,
the predetermined cancellation condition is satisfied in accordance with a second factor including that the interference state is detected and that the another user object is greater in power or higher in priority than the user object, and
the processing circuitry updates the master-slave relationship concerned with the predetermined object with another one of the first relationships in which the predetermined object becomes a dependent object of the another user object in a case that the predetermined cancellation condition is satisfied in accordance with the second factor.

15. The information processing system according to claim 5, wherein
the processing circuitry is further configured to store second rendering information for rendering a second animation concerned with only the user object,
the second state includes a proximity state where the distance is longer than the predetermined distance and shorter than or equal to a second predetermined distance, and a non-proximity state where the distance is longer than the second predetermined distance, and
the processing circuitry is further configured to the second animation in accordance with a transition from the non-proximity state to the proximity state.

16. The information processing system according to claim 1, wherein
the predetermined object includes a gift object indicating a gift presented from another user, and
the processing circuitry generates the positional relationship information of the gift object in a case that the gift object is rendered in the virtual space.

17. The information processing system according to claim 1, wherein
the first part is a hand of the user, and
the second part is an arm of the user.

18. The information processing system according to claim 1, wherein
the first part is an arm of the user, and
the second part is a body of the user.

19. An information processing method executed by a computer, the information processing method comprising:
storing object information relating to plural objects within a virtual space;
generating a display image by rendering the plural objects in the virtual space in accordance with the object information;
acquiring a user input of a user, wherein the user input relates to a user object of the plural objects, the user object being associated with the user, and the user object including a first part and a second part coupled to the first part;
determining a movement of the first part of the user object in the virtual space in accordance with the user input;
generating positional relationship information in accordance with the movement of the user object, the positional relationship information indicating a positional relationship in the virtual space between the first part and a predetermined object of the plural objects;
storing first rendering information for rendering a first animation with a combination of the first and second parts of the user object and the predetermined object; and
generating the first animation in accordance with the first rendering information in a case that a distance between the predetermined object and the first part is shorter than or equal to a predetermined distance according to the positional relationship information, wherein
the first animation includes animation corresponding to the movement of the first part of the user object and animation corresponding to movement of the second part of the user object.

20. A non-transitory computer readable medium storing computer executable instructions which, when executed by a computer, cause the computer to execute a process comprising:
storing object information relating to plural objects within a virtual space;
generating a display image by rendering the plural objects in the virtual space in accordance with the object information;
acquiring a user input of a user, wherein the user input relates to a user object of the plural objects, the user object being associated with the user, and the user object including a first part and a second part coupled to the first part;
determining a movement of the first part of the user object in the virtual space in accordance with the user input;
generating positional relationship information in accordance with the movement of the user object, the positional relationship information indicating a positional relationship in the virtual space between the first part and a predetermined object of the plural objects;
storing first rendering information for rendering a first animation with a combination of the first and second parts of the user object and the predetermined object; and
generating the first animation in accordance with the first rendering information in a case that a distance between the predetermined object and the first part is shorter than or equal to a predetermined distance according to the positional relationship information, wherein
the first animation includes animation corresponding to the movement of the first part of the user object and animation corresponding to movement of the second part of the user object.

* * * * *